United States Patent
Wang

(10) Patent No.: US 11,910,022 B2
(45) Date of Patent: Feb. 20, 2024

(54) DECODED PICTURE BUFFER MEMORY ALLOCATION AND PICTURE OUTPUT IN SCALABLE VIDEO CODING

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/946,637

(22) Filed: Sep. 16, 2022

(65) Prior Publication Data

US 2023/0023356 A1 Jan. 26, 2023

Related U.S. Application Data

(63) Continuation of application No. PCT/US2021/022559, filed on Mar. 16, 2021.
(Continued)

(51) Int. Cl.
*H04N 19/70* (2014.01)
*H04N 19/132* (2014.01)
(Continued)

(52) U.S. Cl.
CPC ........... *H04N 19/70* (2014.11); *H04N 19/132* (2014.11); *H04N 19/172* (2014.11);
(Continued)

(58) Field of Classification Search
CPC .... H04N 19/70; H04N 19/132; H04N 19/172; H04N 19/174; H04N 19/186;
(Continued)

(56) References Cited

U.S. PATENT DOCUMENTS 9,942,545 B2 4/2018 Kwon et al.
2003/0202579 A1 10/2003 Lin
(Continued)

FOREIGN PATENT DOCUMENTS

CN 104871540 B * 4/2019 ........... H04N 19/105
JP 2016531451 A * 7/2014 ............. H04N 19/70
(Continued)

OTHER PUBLICATIONS

Document: JVET-Q2001-v15, Bross, B., et al., "Versatile Video Coding (Draft 8),"Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
(Continued)

*Primary Examiner* — Tracy Y. Li
(74) *Attorney, Agent, or Firm* — Conley Rose, P.C.

(57) ABSTRACT

Methods and apparatus for video processing, including coding and decoding, are described. One example video processing method includes performing a conversion between a video having one or more video layers and a bitstream of the video according to a format rule, and wherein the format rule specifies that a value of a flag that indicates whether to remove pictures previously decoded and stored in a decoded picture buffer from the decoded picture buffer when decoding an access unit of a certain type is included in the bitstream.

19 Claims, 16 Drawing Sheets

Related U.S. Application Data

(60) Provisional application No. 62/990,749, filed on Mar. 17, 2020.

(51) Int. Cl.
  *H04N 19/172* (2014.01)
  *H04N 19/30* (2014.01)
  *H04N 19/423* (2014.01)
  *H04N 19/593* (2014.01)
  *H04N 19/186* (2014.01)
  *H04N 19/174* (2014.01)

(52) U.S. Cl.
  CPC ......... *H04N 19/174* (2014.11); *H04N 19/186* (2014.11); *H04N 19/30* (2014.11); *H04N 19/423* (2014.11); *H04N 19/593* (2014.11)

(58) Field of Classification Search
  CPC .... H04N 19/30; H04N 19/423; H04N 19/593; H04N 19/11
  See application file for complete search history.

(56) References Cited

U.S. PATENT DOCUMENTS

| | | | |
|---|---|---|---|
| 2008/0007438 A1* | 1/2008 | Segall | H04N 19/48 |
| | | | 375/E7.199 |
| 2013/0077681 A1 | 3/2013 | Chen et al. | |
| 2014/0086314 A1 | 3/2014 | Hebel et al. | |
| 2014/0086341 A1 | 3/2014 | Wang | |
| 2014/0301469 A1 | 10/2014 | Wang et al. | |
| 2015/0016545 A1 | 1/2015 | Ramasubramonian et al. | |
| 2015/0103888 A1 | 4/2015 | Chen | |
| 2015/0195545 A1* | 7/2015 | Wang | H04N 19/187 |
| | | | 375/240.02 |
| 2015/0195555 A1 | 7/2015 | Hendry | |
| 2015/0271517 A1 | 9/2015 | Pang | |
| 2015/0304665 A1* | 10/2015 | Hannuksela | H04N 19/70 |
| | | | 375/240.02 |
| 2016/0044324 A1* | 2/2016 | Deshpande | H04N 19/423 |
| | | | 375/240.25 |
| 2017/0085905 A1 | 3/2017 | Kadono et al. | |
| 2019/0174144 A1 | 6/2019 | Hannuksela | |
| 2020/0077107 A1 | 3/2020 | Deshpande | |
| 2021/0092359 A1* | 3/2021 | Nassor | H04N 19/172 |

FOREIGN PATENT DOCUMENTS

| | | | | |
|---|---|---|---|---|
| JP | 2020017970 A | | 1/2020 | |
| WO | WO-2015142725 A1 * | | 9/2015 | ........... H04N 19/124 |

OTHER PUBLICATIONS

ITU-T and ISO/IEC, "Information technology—High efficiency coding and media delivery in heterogeneous environments—Part 2: High Efficiency Video Coding," Rec. ITU-T H.265 | ISO/IEC DIS 23008-2:201x (4th Ed.) ISO/IEC JTC 1/SC 29/WG 11 N17661, Apr. 20, 2018, 8 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Li, X., et al., VTM software, Retrieved from the internet: https://vcgit.hhi.fraunhofer.de/jvet/VVCSoftware_VTM.git, Dec. 13, 2022, 3 pages.
ISO/IEC JTC 1, Information technology—Coding of audio-visual objects—Part 12: ISO base media file format, Technical Corrigendum, ISO/IEC 14496-12:2015/Cor.1, Jun. 3, 2016, 303 pages.
"Editors Version of DASH IS 4th Edition," Information technology—Dynamic adaptive streaming over http (DASH)—Part 1: Media presentation description and segment formats, ISO/IEC 23009-1, ISO/IEC JTC1/SC29/WG11 MPEG2019/m52458, Jan. 2020, 287 pages.
Foreign Communication From a Related Counterpart Application, International Application No. PCT/US2021/022547, International Search Report dated Jun. 3, 2021, 10 pages.
Foreign Communication From a Related Counterpart Application, International Application No. PCT/US2021/022559, International Search Report dated Jul. 28, 2021, 17 pages.
Foreign Communication From a Related Counterpart Application, International Application No. PCT/US2021/022570, International Search Report dated Jul. 28, 2021, 18 pages.
Non-Final Office Action dated Jan. 26, 2023, 29 pages, U.S. Appl. No. 17/946,647, filed Sep. 16, 2022.
Foreign Communication From a Related Counterpart Application, Indian Application No. 202227053010, Indian Office Action dated Feb. 203, 2023, 6 pages.
Document: JCTVC-P0187, Wang, Y.K., et al., "HEVCv1/MV-HEVC/SHVC HLS: On inference of NoOutputOfPriorPicsFlag," Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014, 4 pages.
Document: JVET-Q0117-v1, Wang, Y.K., et al., AHG9: Cleanups on parameter sets, Joint Video Experts Team (JVET) of ITU-T SG 16 WP 3 and ISO/IEC JTC 1/SC 29/WG 11, 17th Meeting: Brussels, BE Jan. 7-17, 2020, 9 pages.
Document: JVET-R0066-v1, Wang, Y.K., et al., "AHG8/AHG9: On DPB memory allocation and derivation of NoOutputOfPriorPicsFlag", Joint Video Experts Team (JVET) of ITU-T SG 16 WP 3 and ISO/IEC JTC 1/SC 29/WG 11, 18th Meeting: by teleconference, Apr. 15-24, 2020, 6 pages.
Document: JVET-Q0308-v1, Hendry, "[AHG9]: On DPB parameter for output layer set," Joint Video Experts Team (JVET) of ITU-T SG 16 WP 3 and ISO/IEC JTC 1/SC 29/WG 11, 17th Meeting: Brussels, BE, Jan. 7-17, 2020, 3 pages.
Document: JVET-Q0158-v1, Seregin, V., et al., "AHG8: Clarification on DPB structure and picture output," Joint Video Experts Team (JVET) of ITU-T SG 16 WP 3 and ISO/IEC JTC 1/SC 29/WG 11, 17th Meeting: Brussels, BE, Jan. 7-17, 2020, 5 pages.
Document: JVET-O0497, Sanchez, Y., et al., "AHG17: On layer grouping for independent regions and ARC," Joint Video Experts Team (JVET) of ITU-T SG 16 WP 3 and ISO/IEC JTC 1/SC 29/WG 11, 15th Meeting: Gothenburg, SE, Jul. 3-12, 2019, 2 pages.
Document: JCTVC-R0049, Hannuksela, M., "MV-HEVC/SHVC HLS: VPSs with nuh_layer_id greater than 0," Joint Collaborative Team on Video Coding (JCT-VC) of ITU-T SG 16 WP 3 and ISO/IEC JTC 1/SC 29/WG 11 18th Meeting: Sapporo, JP, Jun.30-Jul. 9, 2014, 4 pages.
Document: JVET-R0067-v1, Wang, Y.K., et al., "AHG8/AHG9: On the derivation of PictureOutputFlag," Joint Video Experts Team (JVET) of ITU-T SG 16 WP 3 and ISO/IEC JTC 1/SC 29/WG 11, 18th Meeting: by teleconference, Apr. 15-24, 2020, 5 pages.
Foreign Communication From a Counterpart Application, European Application No. 21771243.9, Extended European Search Report dated Jul. 14, 2023, 13 pages.
Foreign Communication From a Counterpart Application, European Application No. 21771386.6, Extended European Search Report dated Jul. 20, 2023, 10 pages.
Document: JVET-P0228, Choi, B., et al., "AHG8: On signaling output layers," Joint Video Experts Team (JVET) of ITU-T SG 16 WP 3 and ISO/IEC JTC 1/SC 29/WG 11, 16th Meeting: Geneva, CH, October 1-11, 2019, 5 pages.
Document: JVET-Q0814-v2, Seregin, V., et al., "AHG8/AHG9: DPB structure and picture output," Joint Video Experts Team (JVET) of ITU-T SG 16 WP 3 and ISO/IEC JTC 1/SC 29/WG 11, 17th Meeting: Brussels, BE, Jan. 7-17, 2020, 9 pages.
Final Office Action dated Sep. 8, 2023, 18 pages, U.S. Appl. No. 17/946,624, filed Sep. 16, 2022.

\* cited by examiner

730

732

Performing a conversion between a video having one or more video layers and a bitstream of the video according to a format rule, and wherein the format rule specifies that a greatest allowed value of a chroma format indicator and/or a greatest allowed value of a bit depth used to represent pixels of the video control a value of a variable that indicates whether pictures in a decoded picture buffer prior to a current picture in decoding order in the bitstream are output before the pictures are removed from the decoded picture buffer

FIG. 7C

Performing a conversion between a video having one or more video layers and a bitstream of the video according to a rule, and wherein the rule specifies that a value of a variable that indicates whether pictures in a decoded picture buffer prior to a current picture in decoding order in the bitstream are output before the pictures are removed from the decoded picture buffer is independent of whether separate color planes are used for encoding the video

Performing a conversion a conversion between a video having one or more video layers and a bitstream of the video according to a format rule, and wherein the format rule specifies that a value of a variable indicating whether to output a picture in an access unit is determined based on a flag indicating whether to output another picture in the access unit

Performing a conversion between a video having one or more video layers and a bitstream of the video according to a format rule, and wherein the format rule specifies that in case that the video comprises only one output layer, an access unit that does not include an output layer is coded by setting a variable indicating whether to output a picture in the access unit to a first value for the picture having a highest layer ID (identification) value and to a second value for all other pictures

FIG. 9C

DECODED PICTURE BUFFER MEMORY ALLOCATION AND PICTURE OUTPUT IN SCALABLE VIDEO CODING

CROSS REFERENCE TO RELATED APPLICATIONS

This application is a continuation of International Patent Application No. PCT/US2021/022559, filed on Mar. 16, 2021, which claims the priority to and benefits of U.S. Provisional Patent Application No. 62/990,749, filed on Mar. 17, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video having one or more video layers comprising one or more video pictures and a coded representation of the video; wherein the coded representation includes a video parameter set that indicates a maximum value of a chroma format indicator and/or a maximum value of bit depth used to represent pixels of the video.

In another example aspect, another video processing method is disclosed. The method includes performing a conversion between a video having one or more video layers and a coded representation of the video, wherein the coded representation conforms to a format rule that specifies that a maximum picture width and/or a maximum picture height for video pictures of all video layers controls a value of a variable that indicates whether pictures in a decoder buffer are output prior to removing from the decoder buffer.

In another example aspect, another video processing method is disclosed. The method includes performing a conversion between a video having one or more video layers and a coded representation of the video, wherein the coded representation conforms to a format rule that specifies that maximum value of a chroma format indicator and/or a maximum value of bit depth used to represent pixels of the video control a value of a variable that indicates whether pictures in a decoder buffer are output prior to removing from the decoder buffer.

In another example aspect, another video processing method is disclosed. The method includes performing a conversion between a video having one or more video layers and a coded representation of the video, wherein the coded representation conforms to a format rule that specifies that a value of a variable that indicates whether pictures in a decoder buffer are output prior to removing from the decoder buffer is independent of whether separate color planes are used for encoding the video.

In another example aspect, another video processing method is disclosed. The method includes performing a conversion between a video having one or more video layers and a coded representation of the video, wherein the coded representation conforms to a format rule that specifies that a value of a variable that indicates whether pictures in a decoder buffer are output prior to removing from the decoder buffer is included in the coded representation at an access unit (AU) level.

In another example aspect, another video processing method is disclosed. The method includes performing a conversion between a video having one or more video layers and a coded representation of the video, wherein the coded representation conforms to a format rule that specifies that a picture output flag for a video picture in an access unit is determined based on a pic_output_flag variable of another video picture in the access unit.

In another example aspect, another video processing method is disclosed. The method includes performing a conversion between a video having one or more video layers and a coded representation of the video, wherein the coded representation conforms to a format rule that specifies that, for a video picture that does not belong to an output layer, a value of a picture output flag.

In another example aspect, another video processing method is disclosed. The method includes performing a conversion between a video and a bitstream of the video according to a format rule, wherein the bitstream includes one or more output layer sets (OLSs), each OLS comprising one or more coded layer video sequences, and wherein the format rule specifies that a video parameter set indicates, for each of the one or more OLSs, a greatest allowed value of a chroma format indicator and/or a greatest allowed value of a bit depth used to represent pixels of the video.

In another example aspect, another video processing method is disclosed. The method includes performing a conversion between a video having one or more video layers and a bitstream of the video according to a format rule, and wherein the format rule specifies that a maximum picture width and/or a maximum picture height for video pictures of all video layers controls a value of a variable that indicates whether pictures in a decoded picture buffer prior to a current picture in decoding order in the bitstream are output before the pictures are removed from the decoded picture buffer.

In another example aspect, another video processing method is disclosed. The method includes performing a conversion between a video having one or more video layers and a bitstream of the video according to a format rule, and wherein the format rule specifies that a greatest allowed value of a chroma format indicator and/or a greatest allowed value of a bit depth used to represent pixels of the video control a value of a variable that indicates whether pictures in a decoded picture buffer prior to a current picture in decoding order in the bitstream are output before the pictures are removed from the decoded picture buffer.

In another example aspect, another video processing method is disclosed. The method includes performing a conversion between a video having one or more video layers and a bitstream of the video according to a rule, and wherein the rule specifies that a value of a variable that indicates whether pictures in a decoded picture buffer prior to a current picture in decoding order in the bitstream are output before the pictures are removed from the decoded picture buffer is independent of whether separate color planes are used for encoding the video.

In another example aspect, another video processing method is disclosed. The method includes performing a conversion between a video having one or more video layers and a bitstream of the video according to a format rule, and wherein the format rule specifies that a value of a flag that indicates whether to remove pictures previously decoded and stored in a decoded picture buffer from the decoded picture buffer when decoding an access unit of a certain type is included in the bitstream.

In another example aspect, another video processing method is disclosed. The method includes performing a conversion between a video having one or more video layers and a bitstream of the video according to a format rule, and wherein the format rule specifies that a value of a first flag that indicates whether to remove pictures previously decoded and stored in a decoded picture buffer from the decoded picture buffer when decoding an access unit of a particular type is not indicated in a picture header.

In another example aspect, another video processing method is disclosed. The method includes performing a conversion between a video having one or more video layers and a bitstream of the video according to a format rule, and wherein the format rule specifies that a value of a flag associated with an access unit that indicates whether to remove pictures previously decoded and stored in a decoded picture buffer from the decoded picture buffer depends on a value of the flag of each picture of the access unit.

In another example aspect, another video processing method is disclosed. The method includes performing a conversion between a video having one or more video layers and a bitstream of the video according to a format rule, and wherein the format rule specifies that a value of a variable indicating whether to output a picture in an access unit is determined based on a flag indicating whether to output another picture in the access unit.

In another example aspect, another video processing method is disclosed. The method includes performing a conversion between a video having one or more video layers and a bitstream of the video according to a format rule, and wherein the format rule specifies that a value of a variable indicating whether to output a picture in an access unit is set equal to a certain value in case that the picture does not belong to an output layer.

In another example aspect, another video processing method is disclosed. The method includes performing a conversion between a video having one or more video layers and a bitstream of the video according to a format rule, and wherein the format rule specifies that in case that the video comprises only one output layer, an access unit that does not include an output layer is coded by setting a variable indicating whether to output a picture in the access unit to a first value for the picture having a highest layer ID (identification) value and to a second value for all other pictures.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present document.

BRIEF DESCRIPTION OF DRAWINGS

FIGS. 7A to 7D show flowcharts for example methods of video processing based on some implementations of the disclosed technology.

FIGS. 9A to 9C show flowcharts for example methods of video processing based on some implementations of the disclosed technology.

DETAILED DESCRIPTION

Figure 1:
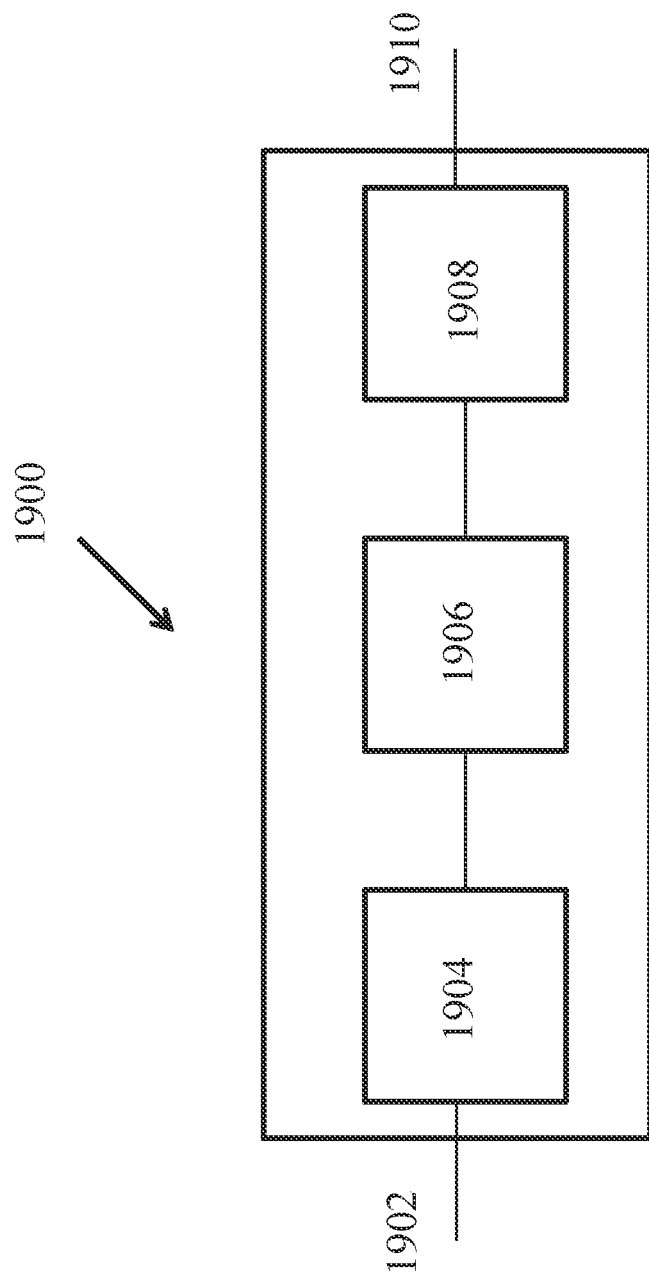
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Initial Discussion

This patent document is related to video coding technologies. Specifically, it is about signalling of decoded picture buffer (DPB) parameters for DPB memory allocation as well as specifying the output of decoded pictures in scalable video coding, wherein a video bitstream can contain more than one layer. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RAP Random Access Point
RB SP Raw Byte Sequence Payload
SEI Supplemental Enhancement Information
SPS Sequence Parameter Set
SVC Scalable Video Coding
VCL Video Coding Layer
VPS Video Parameter Set
VTM VVC Test Model
VUI Video Usability Information
VVC Versatile Video Coding 3. Video Coding Introduction Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion, Final Draft International Standard (FDIS), at the July 2020 meeting.

3.1. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VP S), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need of any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the HLS aspects have been significantly simplified at the sacrifice of some flexibilities. For example, an IRAP AU is required to contain a picture for each of the layers present in the coded video sequence (CVS).

3.2. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signaling of intra random access points (IRAP) pictures in the network abstraction layer (NAL) unit header, through NAL unit types. Three types of IRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of IRAP pictures, altogether six different NAL units are defined to signal the properties of the IRAP pictures, which can be used to better match the stream access point types as defined in the ISO base media file format (ISOBMFF), which are utilized for random access support in dynamic adaptive streaming over HTTP (DASH).

VVC supports three types of IRAP pictures, two types of IDR pictures (one type with or the other type without associated random access decodable leading (RADL) pictures) and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of gradual decoding refresh (GDR) in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point supplemental enhancement information (SEI) message for signaling of GDR random access points and the recovery points. In VVC, a new NAL unit type is specified for indication of GDR pictures and the recovery point is signaled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed to intra coding entire pictures, thus allowing significant end-to-end delay reduction, which is considered more important nowadays than before as ultralow delay applications like wireless display, online gaming, drone based applications become more popular.

Another GDR related feature in VVC is the virtual boundary signaling. The boundary between the refreshed region (i.e., the correctly decoded region) and the unrefreshed region at a picture between a GDR picture and its recovery point can be signaled as a virtual boundary, and when signaled, in-loop filtering across the boundary would not be applied, thus a decoding mismatch for some samples at or near the boundary would not occur. This can be useful when the application determines to display the correctly decoded regions during the GDR process.

IRAP pictures and GDR pictures can be collectively referred to as random access point (RAP) pictures.

3.3. Parameter Sets

AVC, HEVC, and VVC specify parameter sets. The types of parameter sets include SPS, PPS, adaptation parameter set (APS), and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant *signalling* of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.4. Related Definitions in in VVC

Related definitions in the latest VVC text (in JVET-Q2001-vE/v15) are as follows.

associated IRAP picture (of a particular picture): The previous IRAP picture in decoding order (when present) having the same value of nuh_layer_id as the particular picture.

coded video sequence (CVS): A sequence of AUs that consists, in decoding order, of a CVSS AU, followed by zero or more AUs that are not CVSS AUs, including all subsequent AUs up to but not including any subsequent AU that is a CVSS AU.

coded video sequence start (CVSS) AU: An AU in which there is a picture unit (PU) for each layer in the CVS and the coded picture in each PU is a coded layer video sequence (CLVS) start (CLVSS) picture.

gradual decoding refresh (GDR) AU: An AU in which the coded picture in each present PU is a GDR picture.

gradual decoding refresh (GDR) PU: A PU in which the coded picture is a GDR picture.

gradual decoding refresh (GDR) picture: A picture for which each video coding layer (VCL) NAL unit has nal_unit_type equal to GDR_NUT.

intra random access point (IRAP) AU: An AU in which there is a PU for each layer in the CVS and the coded picture in each PU is an IRAP picture.

intra random access point (IRAP) picture: A coded picture for which all VCL NAL units have the same value of nal_unit_type in the range of IDR_W_RADL to CRA_NUT, inclusive.

leading picture: A picture that is in the same layer as the associated IRAP picture and precedes the associated IRAP picture in output order.

trailing picture: A non-TRAP picture that follows the associated IRAP picture in output order and is not an stepwise temporal sublayer access (STSA) picture.

NOTE—Trailing pictures associated with an IRAP picture also follow the IRAP picture in decoding order. Pictures that follow the associated IRAP picture in output order and precede the associated IRAP picture in decoding order are not allowed.

3.5. VPS Syntax and Semantics in VVC

VVC supports scalability, also known as scalable video coding, wherein multiple layers can be encoded in one coded video bitstream.

In the latest VVC text (in JVET-Q2001-vE/v15), the scalability information is signalled in the VPS, for which the syntax and semantics are as follows.

7.3.2.2 Video Parameter Set Syntax

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         max_tid_ref_present_flag[ i ] | u(1) |
|         if( max_tid_ref_present_flag[ i ] ) | |
|           max_tid_il_ref_pics_plus1[ i ] | u(3) |
|       } | |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc == 2 ) { | |
|         num_output_layer_sets_minus1 | u(8) |
|         for( i = 1; i <= num_output_layer_sets_minus1; i ++) | |
|           for( j = 0; j <= vps_max_layers_minus1; j++ ) | |
|             ols_output_layer_flag[ i ][ j ] | u(1) |
|       } | |
|     } | |
|   } | |
|   vps_num_ptls_minus1 | u(8) |
|   for( i = 0; i <= vps_num_ptls_minus1; i++ ) { | |
|     if( i > 0 ) | |
|       pt_present_flag[ i ] | u(1) |
|     if( vps_max_sublayers_minus1 > 0 && !vps_all_layers_same_num_sublayers_flag ) | |
|       ptl_max_temporal_id[ i ] | u(3) |
|   } | |
|   while( !byte_aligned( ) ) | |
|     vps_ptl_alignment_zero_bit /* equal to 0 */ | f(1) |
|   for( i = 0; i <= vps_num_ptls_minus1; i++ ) | |
|     profile_tier_level( pt_present_flag[ i ], ptl_max_temporal_id[ i ] ) | |
|   for( i = 0; i < TotalNumOlss; i++ ) | |
|     if( vps_num_ptls_minus1 > 0 ) | |
|       ols_ptl_idx[ i ] | u(8) |
|   if( !vps_all_independent_layers_flag ) | |
|     vps_num_dpb_params | ue(v) |
|   if( vps_num_dpb_params > 0 && vps_max_sublayers_minus1 > 0 ) | |
|     vps_sublayer_dpb_params_present_flag | u(1) |
|   for( i = 0; i < vps_num_dpb_params; i++ ) { | |
|     if( vps_max_sublayers_minus1 > 0 && !vps_all_layers_same_num_sublayers_flag ) | |
|       dpb_max_temporal_id[ i ] | u(3) |
|     dpb_parameters( dpb_max_temporal_id[ i ], vps_sublayer_dpb_params_present_flag ) | |
|   } | |
|   for( i = 0; i < TotalNumOlss; i++ ) { | |
|     if( NumLayersInOls[ i ] > 1 ) { | |
|       ols_dpb_pic_width[ i ] | ue(v) |
|       ols_dpb_pic_height[ i ] | ue(v) |
|       if( vps_num_dpb_params > 1 ) | |
|         ols_dpb_params_idx[ i ] | ue(v) |

|  | Descriptor |
|---|---|
| `    }` | |
| `  }` | |
| `  if( !each_layer_is_an_ols_flag )` | |
| `    vps_general_hrd_params_present_flag` | u(1) |
| `  if( vps_general_hrd_params_present_flag ) {` | |
| `    general_hrd_parameters( )` | |
| `    if( vps_max_sublayers_minus1 > 0 )` | |
| `      vps_sublayer_cpb_params_present_flag` | u(1) |
| `    num_ols_hrd_params_minus1` | ue(v) |
| `    for( i = 0; i <= num_ols_hrd_params_minus1; i++ ) {` | |
| `      if( vps_max_sublayers_minus1 > 0 && !vps_all_layers_same_num_sublayers_flag )` | |
| `        hrd_max_tid[ i ]` | u(3) |
| `      firstSubLayer = vps_sublayer_cpb_params_present_flag ? 0 : hrd_max_tid[ i ]` | |
| `      ols_hrd_parameters( firstSubLayer, hrd_max_tid[ i ] )` | |
| `    }` | |
| `    if( num_ols_hrd_params_minus1 + 1 != TotalNumOlss &&` | |
| `        num_ols_hrd_params_minus1 > 0 )` | |
| `      for( i = 1; i < TotalNumOlss; i++ )` | |
| `        if( NumLayersInOls[ i ] > 1 )` | |
| `          ols_hrd_idx[ i ]` | ue(v) |
| `  }` | |
| `  vps_extension_flag` | u(1) |
| `  if( vps_extension_flag )` | |
| `    while( more_rbsp_data( ) )` | |
| `      vps_extension_data_flag` | u(1) |
| `  rbsp_trailing_bits( )` | |
| `}` | |

7.4.3.2 Video Parameter Set RBSP Semantics

A VPS raw byte sequence payload (RBSP) shall be available to the decoding process prior to it being referenced, included in at least one AU with TemporalId equal to 0 or provided through external means.

All VPS NAL units with a particular value of vps_videoparameter_set_id in a CVS shall have the same content.

vps_video_parameter_set_id provides an identifier for the VPS for reference by other syntax elements. The value of vps_videoparameter_set_id shall be greater than 0.

vps_max_layers_minus1 plus 1 specifies the maximum allowed number of layers in each CVS referring to the VPS.

vps_max_sublayers_minus1 plus 1 specifies the maximum number of temporal sublayers that may be present in a layer in each CVS referring to the VPS. The value of vps_max_sublayers_minus1 shall be in the range of 0 to 6, inclusive.

vps_all_layers_same_num_sublayers_flag equal to 1 specifies that the number of temporal sublayers is the same for all the layers in each CVS referring to the VPS. vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1.

vps_layer_id[i] specifies the nuh_layer_id value of the i-th layer. For any two non-negative integer values of m and n, when m is less than n, the value of vps_layer_id[m] shall be less than vps_layer_id[n].

vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. When not present, the value of vps_independent_layer_flag[i] is inferred to be equal to 1.

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i-1, inclusive, such that the value of vps_direct_ref_layer_flag [i][j] is equal to 1.

The variables NumDirectRefLayers[i], DirectRefLayerIdx [i][d], NumRefLayers[i], RefLayerIdx[i][r], and LayerUsedAsRefLayerFlag[j] are derived as follows:

```
for( i = 0; i <= vps_max_layers_minus1; i++ ) {
  for( j = 0; j <= vps_max_layers_minus1; j++ ) {
    dependencyFlag[ i ][ j ] = vps_direct_ref_layer_flag[ i ][ j ]
    for( k = 0, k < i; k++ )
      if( vps_direct_ref_layer_flag[ i ][ k ] && dependencyFlag[ k ][ j ] )
        dependencyFlag[ i ][ j ] = 1
  }
  LayerUsedAsRefLayerFlag[ i ] = 0
}
for( i = 0; i <= vps_max_layers_minus1; i++ ) {
  for( j = 0, d = 0, r = 0; j <= vps_max_layers_minus1; j++ ) {    (37)
    if( direct_ref_layer_flag[ i ][ j ] ) {
      DirectRefLayerIdx[ i ][ d++ ] = j
      LayerUsedAsRefLayerFlag[ j ] = 1
    }
    if( dependencyFlag[ i ][ j ] )
      RefLayerIdx[ i ][ r++ ] = j
  }
  NumDirectRefLayers[ i ] = d
  NumRefLayers[ i ] = r
}
```

The variable GeneralLayerIdx[i], specifying the layer index of the layer with nuh_layer_id equal to vps_layer_id[i], is derived as follows:

for(*i*=0;*i*<=vps_max_layers_minus1;*i*++)

GeneralLayerIdx[vps_layer_id[*i*]]=*i*   (38)

For any two different values of i and j, both in the range of 0 to vps_max_layers_minus1, inclusive, when dependencyFlag[i][j] equal to 1, it is a requirement of bitstream conformance that the values of chroma_format_idc and bit_depth_minus8 that apply to the i-th layer shall be equal to the values of chroma_format_idc and bit_depth_minus8, respectively, that apply to the j-th layer.

max_tid_ref_present_flag[i] equal to 1 specifies that the syntax element max_tid_il_refpics_plus1[i] is present. max_tid_ref_present_flag[i] equal to 0 specifies that the syntax element max_tid_il_ref_pics_plus1[i] is not present. max_tid_il_ref_pics_plus1[i] equal to 0 specifies that interlayer prediction is not used by non-IRAP pictures of the i-th layer. max_tid_il_ref_pics_plus1[i] greater than 0 specifies that, for decoding pictures of the i-th layer, no picture with TemporalId greater than max_tid_il_ref_pics_plus1[i]−1 is used as inter layer reference picture (ILRP). When not present, the value of max_tid_il_ref_pics_plus1[i] is inferred to be equal to 7. each_layer_is_an_ols_flag equal to 1 specifies that each OLS contains only one layer and each layer itself in a CVS referring to the VPS is an OLS with the single included layer being the only output layer. each_layer_is_an_ols_flag equal to 0 that an OLS may contain more than one layer. If vps_max_layers_minus1 is equal to 0, the value of each_layer_is_an_ols_flag is inferred to be equal to 1. Otherwise, when vps_all_independent_layers_flag is equal to 0, the value of each_layer_is_an_ols_flag is inferred to be equal to 0.

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output.

ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of ols_mode_idc shall be in the range of 0 to 2, inclusive. The value 3 of ols_mode_idc is reserved for future use by ITU-T ISO/IEC.

When vps_all_independent_layers_flag is equal to 1 and each_layer_is_an_ols_flag is equal to 0, the value of ols_mode_idc is inferred to be equal to 2.

num_output_layer_sets_minus1 plus 1 specifies the total number of OLSs specified by the VPS when ols_mode_idc is equal to 2.

The variable TotalNumOlss, specifying the total number of OLSs specified by the VPS, is derived as follows:

if(vps_max_layers_minus1==0)

TotalNumOlss=1 else
    if(each_layer_is_an_ols_flag||ols_mode_idc==0||ols_mode_idc==1)

TotalNumOlss=vps_max_layers_minus1+1 else if(ols_mode_idc==2)

TotalNumOlss=num_output_layer_sets_minus1+1   (39)

ols_output_layer_flag[i][j] equal to 1 specifies that the layer with nuh_layer_id equal to vps_layer_id[j] is an output layer of the i-th OLS when ols_mode_idc is equal to 2. ols_output_layer_flag[i][j] equal to 0 specifies that the layer with nuh_layer_id equal to vps_layer_id[j] is not an output layer of the i-th OLS when ols_mode_idc is equal to 2.

The variable NumOutputLayersInOls[i], specifying the number of output layers in the i-th OLS, the variable NumSubLayersInLayerInOLS[i][j], specifying the number of sublayers in the j-th layer in the i-th OLS, the variable OutputLayerIdInOls[i][j], specifying the nuh_layer_id value of the j-th output layer in the i-th OLS, and the variable LayerUsedAsOutputLayerFlag[k], specifying whether the k-th layer is used as an output layer in at least one OLS, are derived as follows:

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( i = 1, i <= vps_max_layers_minus1; i++ ) {
   if( each_layer_is_an_ols_flag | | ols_mode_idc < 2 )
      LayerUsedAsOutputLayerFlag[ i ] = 1
   else /*( !each_layer_is_an_ols_flag && ols_mode_idc = = 2 ) */
      LayerUsedAsOutputLayerFlag[ i ] = 0
}
for( i = 1; i < TotalNumOlss; i++ )
   if( each_layer_is_an_ols_flag | | ols_mode_idc = = 0 ) {
      NumOutputLayersInOls[ i ] = 1
      OutputLayerIdInOls[ i ][ 0 ] = vps_layer_id[ i ]
      for( j = 0; j < i && ( ols_mode_idc = = 0 ); j++ )
         NumSubLayersInLayerInOLS[ i ][ j ] = max_tid_il_ref_pics_plus1[ i ]
      NumSubLayersInLayerInOLS[ i ][ i ] = vps_max_sub_layers_minus1 + 1
   } else if( ols_mode_idc = 1 ) {
      NumOutputLayersInOls[ i ] = i + 1
      for( j = 0, j < NumOutputLayersInOls[ i ], j++ ) {
         OutputLayerIdInOls[ i ][ j ] = vps_layer_id[ j ]
         NumSubLayersInLayerInOLS[ i ][ j ] = vps_max_sub_layers_minus1 + 1
      }
   } else if( ols_mode_idc = = 2 ) {
```

```
    for( j = 0; j <= vps_max_layers_minus1; j++ ) {
      layerIncludedInOlsFlag[ i ][ j ] = 0
      NumSubLayersInLayerInOLS[ i ][ j ] = 0
    }
    for( k = 0, j = 0; k <= vps_max_layers_minus1; k++ )          (40)
      if( ols_output_layer_flag[ i ][ k ] ) {
        layerIncludedInOlsFlag[ i ][ k ] = 1
        LayerUsedAsOutputLayerFlag[ k ] = 1
        OutputLayerIdx[ i ][ j ] = k
        OutputLayerIdInOls[ i ][ j++ ] = vps_layer_id[ k ]
        NumSubLayersInLayerInOLS[ i ][ j ] vps_max_sub_layers_minus1 + 1
      }
    NumOutputLayersInOls[ i ] = j
    for( j = 0; j < NumOutputLayersInOls[ i ]; j++ ) {
      idx = OutputLayerIdx[ i ][ j ]
      for( k = 0; k < NumRefLayers[ idx ]; k++ ) {
        layerIncludedInOlsFlag[ 1 ][ RefLayerIdx[ idx ][ k ] ] = 1
        if( NumSubLayersInLayerInOLS[ i ][ RefLayerIdx[ idx ][ k ] ] <
            max_tid_il_ref_pics_plus1[ OutputLayerIdInOls[ i ][ j ] ] )
          NumSubLayersInLayerInOLS[ i ][ RefLayerIdx[ idx ][ k ] ] =
            max_tid_il_ref_pics_plus1[ OutputLayerIdInOls[ i ][ j ] ]
      }
    }
  }
```

For each value of i in the range of 0 to vps_max_layers_minus1, inclusive, the values of LayerUsedAsRefLayerFlag[i] and LayerUsedAsOutputLayerFlag[i] shall not be both equal to 0. In other words, there shall be no layer that is neither an output layer of at least one OLS nor a direct reference layer of any other layer. For each OLS, there shall be at least one layer that is an output layer. In other words, for any value of i in the range of 0 to TotalNumOlss−1, inclusive, the value of NumOutputLayersInOls[i] shall be greater than or equal to 1. The variable NumLayersInOls[i], specifying the number of layers in the i-th OLS, and the variable LayerIdInOls[i][j], specifying the nuh_layer_id value of the j-th layer in the i-th OLS, are derived as follows:

```
    NumLayersInOls[ 0 ] = 1
    LayerIdInOls[ 0 ][ 0 ] = vps_layer_id[ 0 ]
    for( i = 1; i < TotalNumOlss; i++ ) {
      if( each_layer_is_an_ols_flag ) {
        NumLayersInOls[ i ] = 1
        LayerIdInOls[ i ][ 0 ] = vps_layer_id[ i ]           (41)
      } else if( ols_mode_idc = = 0 | | ols_mode_idc = = 1 ) {
        NumLayersInOls[ i ] = i + 1
        for( j = 0; j < NumLayersInOls[ i ]; j++ )
          LayerIdInOls[ i ][ j ] = vps_layer_id[ j ]
      } else if( ols_mode_idc = = 2 ) {
        for( k = 0, j = 0; k <= vps_max_layers_minus1; k++ )
          if( layerIncludedInOlsFlag[ i ][ k ] )
            LayerIdInOls[ i ][ j++ ] = vps_layer_id[ k ]
        NumLayersInOls[ i ] = j
      }
    }
```

NOTE 1—The 0-th OLS contains only the lowest layer (i.e., the layer with nuh_layer_id equal to vps_layer_id [0]) and for the 0-th OLS the only included layer is output.

The variable OlsLayerIdx[i][j], specifying the OLS layer index of the layer with nuh_layer_id equal to LayerIdInOls [i][j], is derived as follows:

for($i$=0;$i$<TotalNumOlss;$i$++)

for $j$=0;$j$<NumLayersInOls[$i$];$j$++)

OlsLayerIdx[$i$][LayerIdInOls[$i$][$j$]]=$j$          (42)

The lowest layer in each OLS shall be an independent layer. In other words, for each i in the range of 0 to TotalNumOlss−1, inclusive, the value of vps_independent_layer_flag[GeneralLayerIdx[LayerIdInOls[i][0]]] shall be equal to 1.

Each layer shall be included in at least one OLS specified by the VPS. In other words, for each layer with a particular value of nuh_layer_id nuhLayerId equal to one of vps_layer_id[k] for kin the range of 0 to vps_max_layers_minus1, inclusive, there shall be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId.

vps_num_ptls_minus1 plus 1 specifies the number of profile_tier_level( ) syntax structures in the VPS. The value of vps_num_ptls_minus1 shall be less than TotalNumOlss.

pt_present_flag[i] equal to 1 specifies that profile, tier, and general constraints information are present in the i-th profile_tier_level( ) syntax structure in the VPS. pt_present_flag[i] equal to 0 specifies that profile, tier, and general constraints information are not present in the i-th profile_tier_level( )) syntax structure in the VPS. The value of pt_present_flag[0] is inferred to be equal to 1. When pt_present_flag[i] is equal to 0, the profile, tier, and general constraints information for the i-th profile_tier_level( )) syntax structure in the VPS are inferred to be the same as that for the (i−1)-th profile_tier_level( ) syntax structure in the VPS.

ptl_max_temporal_id[i] specifies the TemporalId of the highest sublayer representation for which the level information is present in the i-th profile_tier_level( ) syntax structure in the VPS. The value of ptl_max_temporal_id[i] shall be in the range of 0 to vps_max_sublayers_minus1, inclusive. When vps_max_sublayers_minus1 is equal to 0, the value of ptl_max_temporal_id[i] is inferred to be equal to 0. When vps_max_sublayers_minus1 is greater than 0 and vps_all_layers_same_num_sublayers_flag is equal to 1, the value of ptl_max_temporal_id[i] is inferred to be equal to vps_max_sublayers_minus1.

vps_ptl_alignment_zero_bit shall be equal to 0.

ols_ptl_idx[i] specifies the index, to the list of profile_tier_level( ) syntax structures in the VPS, of the profile_tier_level ( ) syntax structure that applies to the i-th OLS. When present, the value of ols_ptl_idx[i] shall be in the range of 0 to vps_num_ptls_minus1, inclusive. When vps_num_ptls_minus1 is equal to 0, the value of ols_ptl_idx[i] is inferred to be equal to 0.

When NumLayersInOls[i] is equal to 1, the profile_tier_level( ) syntax structure that applies to the i-th OLS is also present in the SPS referred to by the layer in the i-th OLS. It is a requirement of bitstream conformance that, when NumLayersInOls[i] is equal to 1, the profile_tier_level( ) syntax structures signalled in the VPS and in the SPS for the i-th OLS shall be identical.

vps_num_dpb_params specifies the number of dpb_parameters( ) syntax structures in the VPS. The value of vps_num_dpb_params shall be in the range of 0 to 16, inclusive. When not present, the value of vps_num_dpb_params is inferred to be equal to 0.

vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

dpb_max_temporal_id[i] specifies the TemporalId of the highest sublayer representation for which the DPB parameters may be present in the i-th dpb_parameters( ) syntax structure in the VPS. The value of dpb_max_temporal_id[i] shall be in the range of 0 to vps_max_sublayers_minus1, inclusive. When vps_max_sublayers_minus1 is equal to 0, the value of dpb_max_temporal_id[i] is inferred to be equal to 0. When vps_max_sublayers_minus1 is greater than 0 and vps_all_layers_same_num_sublayers_flag is equal to 1, the value of dpb_max_temporal_id[i] is inferred to be equal to vps_max_sublayers_minus1.

ols_dpb_pic_width[i] specifies the width, in units of luma samples, of each picture storage buffer for the i-th OLS.

ols_dpb_pic_height[i] specifies the height, in units of luma samples, of each picture storage buffer for the i-th OLS.

ols_dpb_params_idx[i] specifies the index, to the list of dpb_parameters( ) syntax structures in the VPS, of the dpb_parameters( ) syntax structure that applies to the i-th OLS when NumLayersInOls[i] is greater than 1. When present, the value of ols_dpb_params_idx[i] shall be in the range of 0 to vps_num_dpb_params−1, inclusive. When ols_dpb_params_idx[i] is not present, the value of ols_dpb_params_idx[i] is inferred to be equal to 0.

When NumLayersInOls[i] is equal to 1, the dpb_parameters ( ) syntax structure that applies to the i-th OLS is present in the SPS referred to by the layer in the i-th OLS.

vps_general_hrd_params_present_flag equal to 1 specifies that the VPS contains a general_hrd_parameters( ) syntax structure and other HRD parameters. vps_general_hrd_params_present_flag equal to 0 specifies that the VPS does not contain a general_hrd_parameters( ) syntax structure or other hypothetical reference decoder (BIRD) parameters. When not present, the value of vps_general_hrd_params_present_flag is inferred to be equal to 0.

When NumLayersInOls[i] is equal to 1, the general_hrd_parameters( ) syntax structure and the ols_hrd_parameters ( ) syntax structure that apply to the i-th OLS are present in the SPS referred to by the layer in the i-th OLS. vps_sublayer_cpb_params_present_flag equal to 1 specifies that the i-th ols_hrd_parameters( ) syntax structure in the VPS contains BIRD parameters for the sublayer representations with TemporalId in the range of 0 to hrd_max_tid[i], inclusive. vps_sublayer_cpb_params_present_flag equal to 0 specifies that the i-th ols_hrd_parameters( ) syntax structure in the VPS contains BIRD parameters for the sublayer representation with TemporalId equal to hrd_max_tid[i] only. When vps_max_sublayers_minus1 is equal to 0, the value of vps_sublayer_cpb_params_present_flag is inferred to be equal to 0.

When vps_sublayer_cpb_params_present_flag is equal to 0, the HRD parameters for the sublayer representations with TemporalId in the range of 0 to hrd_max_tid[i]−1, inclusive, are inferred to be the same as that for the sublayer representation with TemporalId equal to hrd_max_tid[i]. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

num_ols_hrd_params_minus1 plus 1 specifies the number of ols_hrd_parameters( ) syntax structures present in the VPS when vps_general_hrd_params_present_flag is equal to 1. The value of num_ols_hrd_params_minus1 shall be in the range of 0 to TotalNumOlss−1, inclusive.

hrd_max_tid[i] specifies the TemporalId of the highest sublayer representation for which the HRD parameters are contained in the i-th ols_hrd_parameters( ) syntax structure. The value of hrd_max_tid[i] shall be in the range of 0 to vps_max_sublayers_minus1, inclusive. When vps_max_sublayers_minus1 is equal to 0, the value of hrd_max_tid[i] is inferred to be equal to 0. When vps_max_sublayers_minus1 is greater than 0 and vps_all_layers_same_num_sublayers_flag is equal to 1, the value of hrd_max_tid[i] is inferred to be equal to vps_max_sublayers_minus1.

ols_hrd_idx[i] specifies the index, to the list of ols_hrd_parameters( ) syntax structures in the VPS, of the ols_hrd_parameters( )) syntax structure that applies to the i-th OLS when NumLayersInOls[i] is greater than 1. The value of ols_hrd_idx[[i] shall be in the range of 0 to num_ols_hrd_params_minus1, inclusive. When NumLayersInOls[i] is equal to 1, the ols_hrd_parameters( ) syntax structure that applies to the i-th OLS is present in the SPS referred to by the layer in the i-th OLS.

If the value of num_ols_hrd_param_minus1+1 is equal to TotalNumOlss, the value of ols_hrd_idx[i] is inferred to be equal to i. Otherwise, when NumLayersInOls[i] is greater than 1 and num_ols_hrd_params_minus1 is equal to 0, the value of ols_hrd_idx[[i] is inferred to be equal to 0.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification shall ignore all vps_extension_data_flag syntax elements.

3.6. SPS Syntax and Semantics in VVC

In the latest VVC text (in JVET-Q2001-vE/v15), the SPS syntax and semantics that are most relevant to the embodiments herein are as follows.

7.3.2.3 Sequence Parameter Set RBSP Syntax

| | Descriptor |
|---|---|
| seq_parameter_set_rbsp( ) { | |
| ... | ue(v) |
| gdr_enabled_flag | u(1) |

-continued

| | Descriptor |
|---|---|
| chroma_format_idc | u(2) |
| ... | ue(v) |
| bit_depth_minus8 | ue(v) |
| ... | ue(v) |
| } | |

7.4.3.3 Sequence Parameter Set RBSP Semantics
. . .
gdr_enabled_flag equal to 1 specifies that GDR pictures may be present in CLVSs referring to the SPS. gdr_enabled_flag equal to 0 specifies that GDR pictures are not present in CLVSs referring to the SPS. chroma_format_idc specifies the chroma sampling relative to the luma sampling as specified in clause 6.2.
. . .
bit_depth_minus8 specifies the bit depth of the samples of the luma and chroma arrays, BitDepth, and the value of the luma and chroma quantization parameter range offset, QpBdOffset, as follows:

$$BitDepth = 8 + bit\_depth\_minus8 \quad (45)$$

$$QpBdOffset = 6 * bit\_depth\_minus8 \quad (46)$$

bit_depth_minus8 shall be in the range of 0 to 8, inclusive.
. . .

3.7. Picture Header Structure Syntax and Semantics in VVC

In the latest VVC text (in JVET-Q2001-vE/v15), the picture header structure syntax and semantics that are most relevant to the embodiments herein are as follows.
7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ... | |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   ... | ue(v) |
| } | |

7.4.3.7 Picture Header Structure Semantics
The picture header (PH) syntax structure contains information that is common for all slices of the coded picture associated with the PH syntax structure.
gdr_or_irap_pic_flag equal to 1 specifies that the current picture is a GDR or IRAP picture. gdr_or_irap_pic_flag equal to 0 specifies that the current picture may or may not be a GDR or IRAP picture.
gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.
  NOTE 1—When gdr_or_irap_pic_flag is equal to 1 and gdr_pic_flag is equal to 0, the picture associated with the PH is an TRAP picture.

ph_pic_order_cnt_lsb specifies the picture order count modulo MaxPicOrderCntLsb for the current picture. The length of the ph_pic_order_cnt_lsb syntax element is log 2_max_pic_order_cnt_lsb_minus4+4 bits. The value of the ph_pic_order_cnt_lsb shall be in the range of 0 to MaxPicOrderCntLsb−1, inclusive.
no_output_of_prior_pics_flag affects the output of previously-decoded pictures in the DPB after the decoding of a CLVSS picture that is not the first picture in the bitstream as specified in Annex C. recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.
When the current picture is a GDR picture, the variable RpPicOrderCntVal is derived as follows:

$$RpPicOrderCntVal = PicOrderCntVal + recovery\_poc\_cnt \quad (81)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous TRAP picture, when present, preceding the associated GDR picture in decoding order.
. . .

3.8. Setting of PictureOutputFlag

In the latest VVC text (in JVET-Q2001-vE/v15), the specification for setting of the value of the variable PictureOutputFlag is as follows (as part of clause 8.1.2 Decoding process for a coded picture).
8.1.2 Decoding Process for a Coded Picture
The decoding processes specified in this clause apply to each coded picture, referred to as the current picture and denoted by the variable CurrPic, in BitstreamToDecode.
Depending on the value of chroma_format_idc, the number of sample arrays of the current picture is as follows:
  If chroma_format_idc is equal to 0, the current picture consists of 1 sample array $S_L$.
  Otherwise (chroma_format_idc is not equal to 0), the current picture consists of 3 sample arrays $S_L$, $S_{Cb}$, $S_{Cr}$. The decoding process for the current picture takes as inputs the syntax elements and upper-case variables from clause 7. When interpreting the semantics of each syntax element in each NAL unit, and in the remaining parts of clause 8, the term "the bitstream" (or part thereof, e.g., a CVS of the bitstream) refers to BitstreamToDecode (or part thereof).
Depending on the value of separate_colour_plane_flag, the decoding process is structured as follows:
  If separate_colour_plane_flag is equal to 0, the decoding process is invoked a single time with the current picture being the output.

Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1 and 2 being assigned to $S_L$, $S_{Cb}$ and $S_{Cr}$, respectively.

NOTE—The variable ChromaArrayType is derived as equal to 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic:

1. The decoding of NAL units is specified in clause 8.2.
2. The processes in clause 8.3 specify the following decoding processes using syntax elements in the slice header layer and above:

Variables and functions relating to picture order count are derived as specified in clause 8.3.1. This needs to be invoked only for the first slice of a picture.

At the beginning of the decoding process for each slice of a non-IDR picture, the decoding process for reference picture lists construction specified in clause 8.3.2 is invoked for derivation of reference picture list 0 (RefPicList[0]) and reference picture list 1 (RefPicList[1]).

The decoding process for reference picture marking in clause 8.3.3 is invoked, wherein reference pictures may be marked as "unused for reference" or "used for long-term reference". This needs to be invoked only for the first slice of a picture.

When the current picture is a CRA picture with NoOutputBeforeRecoveryFlag equal to 1 or GDR picture with NoOutputBeforeRecoveryFlag equal to 1, the decoding process for generating unavailable reference pictures specified in subclause 8.3.4 is invoked, which needs to be invoked only for the first slice of a picture.

PictureOutputFlag is set as follows:

If one of the following conditions is true, PictureOutputFlag is set equal to 0:
   - the current picture is a random access skipped leading (RASL) picture and NoOutputBeforeRecoveryFlag of the associated IRAP picture is equal to 1.
   - gdr_enabled_flag is equal to 1 and the current picture is a GDR picture with NoOutputBeforeRecoveryFlag equal to 1.
   - gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture.
   - sps_video_parameter_set_id is greater than 0, ols_mode_idc is equal to 0 and the current AU contains a picture picA that satisfies all of the following conditions:
     - PicA has PictureOutputFlag equal to 1.
     - PicA has nuh_layer_id nuhLid greater than that of the current picture.
     - PicA belongs to the output layer of the OLS (i.e., OutputLayerIdInOls[TargetOlsIdx][0] is equal to nuhLid).
   - sps_video_parameter_set_id is greater than 0, ols_mode_idc is equal to 2, and ols_output_layer_flag[TargetOlsIdx][GeneralLayerIdx[nuh_layer_id]] is equal to 0.

Otherwise, PictureOutputFlag is set equal to pic_output_flag.

3. The processes in clauses 8.4, 8.5, 8.6, 8.7, and 8.8 specify decoding processes using syntax elements in all syntax structure layers. It is a requirement of bitstream conformance that the coded slices of the picture shall contain slice data for every coding tree unit (CTU) of the picture, such that the division of the picture into slices, and the division of the slices into CTUs each forms a partitioning of the picture.

4. After all slices of the current picture have been decoded, the current decoded picture is marked as "used for short-term reference", and each ILRP entry in RefPicList[0] or RefPicList[1] is marked as "used for short-term reference".

3.9. Setting of DPB Parameters for HRD Operations

In the latest VVC text (in JVET-Q2001-vE/v15), the specification for setting of DPB parameters for HRD operations is as follows (as part of clause C.1).

C.1 General

. . .

For each bitstream conformance test, the coded picture buffer (CPB) size (number of bits) is CpbSize[Htid][ScIdx] as specified in clause 7.4.6.3, where ScIdx and the HRD parameters are specified above in this clause, and the DPB parameters max_dec_pic_buffering_minus1[Htid], max_num_reorder_pics[Htid], and MaxLatencyPictures[Htid] are found in or derived from the dpb_parameters( ) syntax structure that applies to the target OLS as follows:

If the target OLS contains only one layer, the dpb_parameters( ) syntax structure is found in the SPS referred to be the layer in the target OLS.

Otherwise (the target OLS contains more than one layer), the dpb_parameters( ) is identified by ols_dpb_params_idx[TargetOlsIdx] found in the VPS.

3.10. Setting of NoOutputOfPriorPicsFlag

In the latest VVC text (in JVET-Q2001-vE/v15), the specifications for setting of the value of the variable NoOutputOfPriorPicsFlag are as follows (as part of the specifications for removal of pictures from the DPB).

C.3.2 Removal of Pictures from the DPB Before Decoding of the Current Picture

The removal of pictures from the DPB before decoding of the current picture (but after parsing the slice header of the first slice of the current picture) happens instantaneously at the CPB removal time of the first decoding unit (DU) of AU n (containing the current picture) and proceeds as follows:

The decoding process for reference picture list construction as specified in clause 8.3.2 is invoked and the decoding process for reference picture marking as specified in clause 8.3.3 is invoked.

When the current AU is a CVSS AU that is not AU 0, the following ordered steps are applied:
1. The variable NoOutputOfPriorPicsFlag is derived for the decoder under test as follows:
   If the value of pic_width_max_in_luma_samples, pic_height_max_in_luma_samples, chroma_format_idc, separate_colour_plane_flag, bit_depth_minus8, or max_dec_pic_buffering_minus1 [Htid] derived for any picture in the current AU is different from the value of pic_width_max_in_luma_samples, pic_height_max_in_luma_samples, chroma_format_idc, separate_colour_plane_flag, bit_depth_minus8, or max_dec_pic_buffering_minus1[Htid], respectively, derived for the preceding picture in the same CLVS, NoOutputOfPriorPicsFlag may (but should not) be set to 1 by the decoder under test, regardless of the value of no_output_of_prior_pics_flag.
      NOTE—Although setting NoOutputOfPriorPicsFlag equal to no_output_of_prior_pics_flag is preferred under these conditions, the decoder under test is allowed to set NoOutputOfPriorPicsFlag to 1 in this case.
   Otherwise, NoOutputOfPriorPicsFlag is set equal to no_output_of_prior_pics_flag.
2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.

When both of the following conditions are true for any pictures k in the DPB, all such pictures k in the DPB are removed from the DPB:
   picture k is marked as "unused for reference".
   picture k has PictureOutputFlag equal to 0 or its DPB output time is less than or equal to the CPB removal time of the first DU (denoted as DU m) of the current picture n; i.e., DpbOutputTime[k] is less than or equal to DuCpbRemovalTime[m].
For each picture that is removed from the DPB, the DPB fullness is decremented by one.

C.5.2.2 Output and Removal of Pictures from the DPB

The output and removal of pictures from the DPB before the decoding of the current picture (but after parsing the slice header of the first slice of the current picture) happens instantaneously when the first DU of the AU containing the current picture is removed from the CPB and proceeds as follows:
   The decoding process for reference picture list construction as specified in clause 8.3.2 and decoding process for reference picture marking as specified in clause 8.3.3 are invoked.
   If the current picture is a CLVSS picture that is not picture 0, the following ordered steps are applied:
   1. The variable NoOutputOfPriorPicsFlag is derived for the decoder under test as follows:
      If the value of pic_width_max_in_luma_samples, pic_height_max_in_luma_samples, chroma_format_idc, separate_colour_plane_flag, bit_depth_minus8, or max_dec_pic_buffering_minus1[Htid] derived for any picture of the current AU is different from the value of pic_width_max_in_luma_samples, pic_height_max_in_luma_samples, chroma_format_idc, separate_colour_plane_flag, bit_depth_minus8, or max_dec_pic_buffering_minus1[Htid], respectively, for the preceding picture in the same CLVS, NoOutputOfPriorPicsFlag may (but should not) be set to 1 by the decoder under test, regardless of the value of no_output_of_prior_pics_flag.
         NOTE—Although setting NoOutputOfPriorPicsFlag equal to no_output_of_prior_pics_flag is preferred under these conditions, the decoder under test is allowed to set NoOutputOfPriorPicsFlag to 1 in this case.
      Otherwise, NoOutputOfPriorPicsFlag is set equal to no_output_of_prior_pics_flag.
   2. The value of NoOutputOfPriorPicsFlag derived for the decoder under test is applied for the HRD as follows:
      If NoOutputOfPriorPicsFlag is equal to 1, all picture storage buffers in the DPB are emptied without output of the pictures they contain and the DPB fullness is set equal to 0.
      Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.
   Otherwise (the current picture is not a CLVSS picture or the CLVSS picture is picture 0), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:
   The number of pictures in the DPB that are marked as "needed for output" is greater than max_num_reorder_pics[Htid].
   max_latency_increase_plus1[Htid] is not equal to 0 and there is at least one picture in the DPB that is marked as "needed for output" for which the associated variable PicLatencyCount is greater than or equal to MaxLatencyPictures[Htid].
   The number of pictures in the DPB is greater than or equal to max_dec_pic_buffering_minus1[Htid]+1.

4. Technical Problems Solved by Disclosed Technical Solutions

The existing scalability design in the latest VVC text (in JVET-Q2001-vE/v15) has the following problems:
1) Currently, the maximum values of picture width and height for all pictures of all layers are signalled in the VPS, to enable the decoder to properly allocate the memory for the DPB. Like the picture width and height, the chroma format and the bit depth, currently specified by the SPS syntax elements chroma_format_idc and bit_depth_minus8, respectively, also affect the size for a picture storage buffer in the DPB. However, the maximum values of the chroma_format_idc and bit_depth_minus8 for all pictures of all layers are not signalled.
2) Currently, the setting of the value of the variable NoOutputOfPriorPicsFlag involves the change of the value of pic_width_max_in_luma_samples or pic_height_max_in_luma_samples. However, the maximum values of picture width and height for all pictures of all layers should be used instead.

3) Currently, the setting of NoOutputOfPriorPicsFlag involves the change of the value of chroma_format_idc or bit_depth_minus8. However, the maximum values of chroma format and bit depth for all pictures of all layers should be used instead.

4) Currently, the setting of NoOutputOfPriorPicsFlag involves the change of the value of separate colour plane flag. However, the separate colour plane flag is only present and used when chroma_format_idc is equal to 3, which specifies the 4:4:4 chroma format, while for the 4:4:4 chroma format, the value of separate colour plane flag being equal to 0 or 1 does not affect the buffer size needed for storing a decoded picture. Therefore, the setting of NoOutputOfPriorPicsFlag should not involve the change of the value of separate colour plane flag.

5) Currently, the no_output_of_prior_pics_flag is signalled in the PH for IRAP and GDR pictures, and both the semantics of this flag and the process for the setting of NoOutputOfPriorPicsFlag are specified in a manner that no_output_of_prior_pics_flag is layer specific or PU specific. However, since the DPB operation is OLS specific or AU specific, both the semantics of no_output_of_prior_pics_flag and the use of this flag in the setting of NoOutputOfPriorPicsFlag should be specified in an AU-specific manner.

6) The current text for setting of the value of the variable PictureOutputFlag for a current picture involves the use of the PictureOutputFlag of a picture in the same AU as the current picture and in a higher layer than the current picture. However, for a picture picA that has nuh_layer_id greater than that of the current picture, when PictureOutputFlag of the current picture is being derived, PictureOutputFlag of picA has not yet been derived.

7) The current text for setting of the value of the variable PictureOutputFlag has an issue as described below. There are two layers in the bitstream of the OLS and only the higher layer is an output layer, and in a particular AU auA the picture of the higher layer has pic_output_flag equal to 0. At the decoder side the higher-layer picture of auA is not present (due to e.g. loss or layer down-switching), while the lower-layer picture of auA is present and has pic_output_flag equal to 1. Then the value of PictureOutputFlag of the lower-layer picture of auA would be set equal to 1. However, when an OLS has only one output layer and a picture of the output layer has pic_output_flag equal to 0, it should be interpreted that the encoder (or the content provider) did not want a picture to be output for the AU containing that picture.

8) The current text for setting of the value of the variable PictureOutputFlag has an issue as described below. There are three or more layers in the bitstream of the OLS and only the top layer is an output layer. At the decoder side the top layer picture of the current AU is not present (due to e.g. loss or layer down-switching), while two or more pictures of the lower layers for the current AU are present and these pictures have pic_output_flag equal to 1, then for this AU more than one picture would be output. However, this is problematic as there is only one output layer for the OLS, thus outputting of one only picture was expected by the encoder or content provider.

9) The current text for setting of the value of the variable PictureOutputFlag has an issue as described below. The OLS mode 2 (when ols_mode_idc is equal to 2) can also specify only one output layer like mode 0, but the behavior of outputting a lower layer picture for an AU when the output layer picture (which is also the highest layer picture) is not present is only specified for mode 0.

10) For an OLS containing only one output layer, when the picture of the output layer (which is also the picture of the highest layer) is not available (due to e.g. loss or layer down-switching) to the decoder, the decoder won't be able to know whether the pic_output_flag of that picture was equal to 1 or 0. If it was equal to 1, then it make sense to output a lower-layer picture, but if it was equal to 0 it might be worse from user experience point of view to output a lower-layer picture as the encoder (content provider) put the value equal to 0 for a reason, e.g., there should not be a picture output for this AU for this particular OLS.

5. A Listing of Embodiments and Techniques

To solve the above problems, and others, methods as summarized below are disclosed. The listed items should be considered as examples to explain the general concepts and should not be interpreted in a narrow way. Furthermore, these items can be applied individually or combined in any manner.

Solutions for Solving Problems 1 to 5

1) To solve problem 1, one or both of the maximum values of the chroma_format_idc and bit_depth_minus8 for all pictures of all layers may be signalled in the VPS.

2) To solve problem 2, the setting of the value of the variable NoOutputOfPriorPicsFlag may be specified to be based at least on one or both of the maximum picture width and height for all pictures of all layers may be signalled in the VPS.

3) To solve problem 3, the setting of the value of the variable NoOutputOfPriorPicsFlag may be specified to be based at least on one or both of the maximum values of the chroma_format_idc and bit_depth_minus8 for all pictures of all layers may be signalled in the VPS.

4) To solve problem 4, the setting of the value of the variable NoOutputOfPriorPicsFlag may be specified to be independent of the value of the separate colour plane flag.

5) To solve problem 5, both the semantics of no_output_of_prior_pics_flag and the use of this flag in the setting of NoOutputOfPriorPicsFlag may be specified in an AU-specific manner.
   a. In one example, it may be required that, when present, the value of no_output_of_prior_pics_flag shall be the same for all pictures in an AU, and the value of no_output_of_prior_pics_flag of the AU is considered to be the value of no_output_of_prior_pics_flag of the pictures of the AU.
   b. Alternatively, in one example, the no_output_of_prior_pics_flag may be removed from the PH syntax and may be signalled in the access unit delimiter (AUD) syntax when irap_or_gdr_au_flag is equal to 1.
      i. For single-layer bitstreams, since AUD is optional, the value of no_output_of_prior_pics_flag may be inferred to be equal to 1 when AUD is not present for an TRAP or GDR AU (that means that, if the encoder wants to signal a value 0 for no_output_of_prior_pics_flag for an TRAP or GDR AU in a single-layer bitstream, it has to signal AUD for that AU in the bitstream).
  c. Alternatively, in one example, the value of no_output_of_prior_pics_flag of an AU may be considered to be equal to 0 if and only if no_output_of_prior_pics_flag for each picture of the AU is equal to 0, and otherwise the value of no_output_of_prior_pics_flag of the AU may be considered as equal to 1.
    i. The shortcoming of this approach is that the setting of NoOutputOfPriorPicsFlag and outputting of pictures of a CVSS AU need to wait for the arrival of all pictures in the AU.

Solutions for Solving Problems 6 to 10
  6) To solve problem 6, the setting of PictureOutputFlag for a current picture may be specified to be based at least on the pic_output_flag (instead of the PictureOutputFlag) of a picture in the same AU as the current picture and in a higher layer than the current picture.
  7) To solve problems 7 to 9, the value of PictureOutputFlag for a current picture is set equal to 0 whenever the current picture does not belong to an output layer.
    a. Alternatively, to solve problems 7 and 8, when there is only one output layer, and the output layer (which has to be the top layer when there is only one output layer) is not present for an AU, then PictureOutputFlag is set equal to 1 for the picture that has the highest value of nuh_layer_id among all pictures of the AU available to the decoder and having pic_output_flag equal to 1, and set equal to 0 for all other pictures of the AU available to the decoder.
  8) To solve problem 10, the value of the pic_output_flag of an output layer picture of an AU may be signalled in the AUD or an SEI message in the AU, or signalled in the PH of one or more other pictures in the AU.

6. Embodiments

Below are some example embodiments for some of the aspects summarized above in Section 5, which can be applied to the VVC specification. The changed texts are based on the latest VVC text in JVET-Q2001-vE/v15. Most relevant parts that have been added or modified are highlighted in boldface italics, and some of the deleted parts are marked with double brackets (e.g., [[a]] denotes the deletion of the character "a"). There are some other changes that are editorial in nature and thus not highlighted.

6.1. First Embodiment

This embodiment is for items 1, 2, 3, 4, 5, and 5a.
7.3.2.2 Video Parameter Set Syntax

| | Descriptor |
|---|---|
| video_parameter_set_rbsp( ) { | |
| ... | |
|   for( i = 0; i < TotalNumOlss; i++ ) { | |
|     if( NumLayersInOls[ i ] > 1 ) { | |
|       ***ols_dpb_pic_width*[ i ]** | ue(v) |
|       ***ols_dpb_pic_height*[ i ]** | ue(v) |
|       ***ols_dpb_chroma_format*[ i ] | *u(2)*** |
|       ***ols_dpb_bitdepth_minus8*[ i ] | *ue(v)*** |
|       if( vps_num_dpb_params > 1 ) | |

| | Descriptor |
|---|---|
|       ols_dpb_params_idx[ i ] | ue(v) |
|     } | |
|   } | |
| ... | |
| } | |

7.4.3.2 Video Parameter Set RBSP Semantics
. . .
ols_dpb_pic_width[i] specifies the width, in units of luma samples, of each picture storage buffer for the i-th OLS.
ols_dpb_pic_height[i] specifies the height, in units of luma samples, of each picture storage buffer for the i-th OLS.
ols_dpb_chroma_format[i] specifies the greatest allowed value of chroma_format_idc for all SPSs that are referred to by CLVSs in the CVS for the i-th OLS. ols_dpb_bitdepth_minus8[i] specifies the greatest allowed value of bit_depth_minus8 for all SPSs that are referred to by CLVSs in the CVS for the i-th OLS.
  NOTE 2—For decoding an OLS containing more than one layer and having OLS index i, the deoder can safely allocate memory for the DPB according to the values of the sntax elements ols_dpb_pic_width[i], ols_dpb_pic_height[i], ols_dpb_chroma_format[i], and ols_dpb_bitdepth_minus8[i].
ols_dpb_params_idx[i] specifies the index, to the list of dpb_parameters( ) syntax structures in the VPS, of the dpb_parameters( ) syntax structure that applies to the i-th OLS when NumLayersInOls[i] is greater than 1. When present, the value of ols_dpb_params_idx[i] shall be in the range of 0 to vps_num_dpb_params−1, inclusive. When ols_dpb_params_idx[i] is not present, the value of ols_dpb_params_idx[i] is inferred to be equal to 0. When NumLayersInOls[i] is equal to 1, the dpb_parameters( ) syntax structure that applies to the i-th OLS is present in the SPS referred to by the layer in the i-th OLS.
. . .
7.4.3.3 Sequence Parameter Set RBSP Semantics
. . .
gdr_enabled_flag equal to 1 specifies that GDR pictures may be present in CLVSs referring to the SPS. gdr_enabled_flag equal to 0 specifies that GDR pictures are not present in CLVSs referring to the SPS.
chroma_format_idc specifies the chroma sampling relative to the luma sampling as specified in clause 6.2.
When sps_video_parameter_set_id is greater than 0, it is a requirement of bitstream conformance that, for any OLS with OLS index i that contains one or more layers that refers to the SPS, the value of chroma_format_idc shall be less than or equal to the value of ols_dpb_chroma_format[i].
. . .
bit_depth_minus8 specifies the bit depth of the samples of the luma and chroma arrays, BitDepth, and the value of the luma and chroma quantization parameter range offset, QpBdOffset, as follows:

$$BitDepth = 8 + bit\_depth\_minus8 \quad (45)$$

$$QpBdOffset = 6 * bit\_depth\_minus8 \quad (46)$$

bit_depth_minus8 shall be in the range of 0 to 8, inclusive. When sps_video_parameter_set_id is greater than 0, it is a requirement of bitstream conformance that, for any OLS with OLS index i that contains one or more layers that refers to the SPS, the value of bit_depth_minus8 shall be less than or equal to the value of ols_dpb_bitdepth_minus8[i].
. . .

7.4.3.7 Picture Header Structure Semantics
...

no_output_of_prior_pics_flag affects the output of previously-decoded pictures in the DPB after the decoding of a picture in a CVSS AU that is not the first AU in the bitstream as specified in Annex C.

It is a requirement of bitstream conformance that, when present, the value of no_output_of_prior_pics_flag shall be the same for all pictures of an AU.

When no_output_of_prior_pics_flag is present in the PHs of the pictures of an AU, the value of no_output_of_prior_pics_ flag of the AU is the value of no_output_of_prior_pics_flag of the pictures of the AU.

...

C.1 General
...

For each bitstream conformance test, the CPB size (number of bits) is CpbSize[Htid][ScIdx] as specified in clause 7.4.6.3, where ScIdx and the HRD parameters are specified above in this clause, and the DPB parameters max_dec_pic_buffering_minus1[Htid], max_num_reorder_pics[Htid], and MaxLatencyPictures[Htid] are found in or derived from the dpb_parameters( ) syntax structure that applies to the target OLS as follows:

- If NumLayersInOls[TargetOlsIdx] is equal to 1, the dpb_parameters( ) syntax structure is found in the SPS referred to be the layer in the target OLS, and the variables PicWidthMaxInSamplesY, PicHeightMaxInSamplesY, MaxChromaFormat, and MaxBitDepthMinus8 are set equal to pic_width_max_in_luma_samples, pic_height_max_in_luma_samples, chroma_format_idc, and bit_depth_minus8, respectively, found in the SPS referred to by the layer in the target OLS.
- Otherwise (the target OLS contains more than one layer), the dpb_parameters( ) is identified by ols_dpb_params_idx[TargetOlsIdx] found in the VPS, and the variables PicWidthMaxInSamplesY, PicHeightMaxInSamplesY, MaxChromaFormat, and MaxBitDepthMinus8 are set equal to ols_dpb_pic_width[TargetOlsIdx], ols_dpb_pic_height[TargetOlsIdx], ols_dpb_chroma_format[TargetOlsIdx], and ols_dpb_bitdepth_minus8[TargetOlsIdx], respectively, found in the VPS.

...

C.3.2 Removal of Pictures from the DPB Before Decoding of the Current Picture The removal of pictures from the DPB before decoding of the current picture (but after parsing the slice header of the first slice of the current picture) happens instantaneously at the CPB removal time of the first DU of AU n (containing the current picture) and proceeds as follows:

The decoding process for reference picture list construction as specified in clause 8.3.2 is invoked and the decoding process for reference picture marking as specified in clause 8.3.3 is invoked.

When the current AU is a CVSS AU that is not AU 0, the following ordered steps are applied:

1. The variable NoOutputOfPriorPicsFlag is derived for the decoder under test as follows:

If the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid], respectively, derived for the preceding AU in decoding order, NoOutputOfPriorPicsFlag may (but should not) be set to 1 by the decoder under test, regardless of the value of no_output_of_prior_pics_flag of the current AU NOTE—Although setting NoOutputOfPriorPicsFlag equal to no_output_of_prior_pics_flag of the current AU is preferred under these conditions, the decoder under test is allowed to set NoOutputOfPriorPicsFlag to 1 in this case.

Otherwise, NoOutputOfPriorPicsFlag is set equal to no_output_of_prior_pics_flag of the current AU.

2. The value of NoOutputOfPriorPicsFlag derived for the decoder under test is applied for the BIRD, such that when the value of NoOutputOfPriorPicsFlag is equal to 1, all picture storage buffers in the DPB are emptied without output of the pictures they contain, and the DPB fullness is set equal to 0.

When both of the following conditions are true for any pictures k in the DPB, all such pictures k in the DPB are removed from the DPB:

- picture k is marked as "unused for reference".
- picture k has PictureOutputFlag equal to 0 or its DPB output time is less than or equal to the CPB removal time of the first DU (denoted as DU m) of the current picture n; i.e., DpbOutputTime[k] is less than or equal to DuCpbRemovalTime[m].

For each picture that is removed from the DPB, the DPB fullness is decremented by one.

C.5.2.2 Output and Removal of Pictures from the DPB

The output and removal of pictures from the DPB before the decoding of the current picture (but after parsing the slice header of the first slice of the current picture) happens instantaneously when the first DU of the AU containing the current picture is removed from the CPB and proceeds as follows:

The decoding process for reference picture list construction as specified in clause 8.3.2 and decoding process for reference picture marking as specified in clause 8.3.3 are invoked.

If the current AU is a CVSS AU that is not AU 0, the following ordered steps are applied:

1. The variable NoOutputOfPriorPicsFlag is derived for the decoder under test as follows:

If the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid], respectively, derived for the preceding AU in decoding order, NoOutputOfPriorPicsFlag may (but should not) be set to 1 by the decoder under test, regardless of the value of no_output_of_prior_pics_flag of the current A U.

NOTE—Although setting NoOutputOfPriorPicsFlag equal to no_output_of_prior_pics_flag of the current AU is preferred under these conditions, the decoder under test is allowed to set NoOutputOfPriorPicsFlag to 1 in this case.

Otherwise, NoOutputOfPriorPicsFlag is set equal to no_output_of_prior_pics_flag of the current AU.

2. The value of NoOutputOfPriorPicsFlag derived for the decoder under test is applied for the HRD as follows:
If NoOutputOfPriorPicsFlag is equal to 1, all picture storage buffers in the DPB are emptied without output of the pictures they contain and the DPB fullness is set equal to 0.
Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.
Otherwise (the current picture is not a CLVSS picture or the CLVSS picture is picture 0), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:
The number of pictures in the DPB that are marked as "needed for output" is greater than max_num_reorder_pics[Htid].
max_latency_increase_plus1[Htid] is not equal to 0 and there is at least one picture in the DPB that is marked as "needed for output" for which the associated variable PicLatencyCount is greater than or equal to MaxLatencyPictures[Htid].
The number of pictures in the DPB is greater than or equal to max_dec_pic_buffering_minus1[Htid]+1.

6.2. Second Embodiment

This embodiment is for items 1, 2, 3, 4, 5, and 5c, with text changes relative to text of the first embodiment.
7.4.3.7 Picture Header Structure Semantics
. . .
no_output_of_prior_pics_flag affects the output of previously-decoded pictures in the DPB after the decoding of a picture in a CVSS AU that is not the first AU in the bitstream as specified in Annex C.
[[It is a requirement of bitstream conformance that, when present, the value of no_output_of_prior_pics_flag shall be the same for all pictures of an AU.
When no_output_of_prior_pics_flag is present in the PHs of the pictures of an AU, the value of no_output_of_prior_pics_ flag of the AU is the value of no_output_of_prior_pics_flag of the pictures of the AU.]]
. . .
C.3.2 Removal of Pictures from the DPB Before Decoding of the Current Picture
The removal of pictures from the DPB before decoding of the current picture (but after parsing the slice header of the first slice of the current picture) happens instantaneously at the CPB removal time of the first DU of AU n (containing the current picture) and proceeds as follows:
The decoding process for reference picture list construction as specified in clause 8.3.2 is invoked and the decoding process for reference picture marking as specified in clause 8.3.3 is invoked.
When the current AU is a CVSS AU that is not AU 0, the following ordered steps are applied:
1. The variable NoOutputOfPriorPicsFlag is derived for the decoder under test as follows:
If the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid], respectively, derived for the preceding AU in decoding order, NoOutputOfPriorPicsFlag may (but should not) be set to 1 by the decoder under test, regardless of whether the value of no_output_of_prior_pics_flag [[of the current AU]] is equal to 0 for each picture in the current AU
NOTE—When no_output_of_prior_pics_flag is equal to 0 for each picture in the current AU, [Although]] although setting NoOutputOfPriorPicsFlag equal to 0 [[equal to no_output_of_prior_pics_flag of the current AU]] is preferred under these conditions, the decoder under test is allowed to set NoOutputOfPriorPicsFlag to 1 in this case.
Otherwise, [[NoOutputOfPriorPicsFlag is set equal to no_output_of_prior_pics_flag of the current AU]] if no_output_of_prior_pics_flag is equal to 0 for each picture in the current AU, NoOutputOfPriorPicsFlag is set equal to 0.
Otherwise, NoOutputOfPriorPicsFlag is set equal to 1.
2. The value of NoOutputOfPriorPicsFlag derived for the decoder under test is applied for the BIRD, such that when the value of NoOutputOfPriorPicsFlag is equal to 1, all picture storage buffers in the DPB are emptied without output of the pictures they contain, and the DPB fullness is set equal to 0.
When both of the following conditions are true for any pictures k in the DPB, all such pictures k in the DPB are removed from the DPB:
picture k is marked as "unused for reference".
picture k has PictureOutputFlag equal to 0 or its DPB output time is less than or equal to the CPB removal time of the first DU (denoted as DU m) of the current picture n; i.e., DpbOutputTime[k] is less than or equal to DuCpbRemovalTime[m].
For each picture that is removed from the DPB, the DPB fullness is decremented by one.
C.5.2.2 Output and Removal of Pictures from the DPB
The output and removal of pictures from the DPB before the decoding of the current picture (but after parsing the slice header of the first slice of the current picture) happens instantaneously when the first DU of the AU containing the current picture is removed from the CPB and proceeds as follows:
The decoding process for reference picture list construction as specified in clause 8.3.2 and decoding process for reference picture marking as specified in clause 8.3.3 are invoked.
If the current AU is a CVSS AU that is not AU 0, the following ordered steps are applied:
1. The variable NoOutputOfPriorPicsFlag is derived for the decoder under test as follows:
If the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeight- MaxInSamplesY, MaxChromaFormat, MaxBitDepthMinus8, or max_dec_pic_buffering_minus1[Htid], respectively, derived for the preceding AU in decoding order, NoOutputOfPriorPicsFlag may (but should not) be set to 1 by the decoder under test, regardless of whether the value of no_output_of_prior_pics_flag [[of the current AU]] is equal to 0 for each picture in the current A U.

NOTE—When no_output_of_prior_pics_flag is equal to 0 for each picture in the current AU, although [[Although]] setting NoOutputOfPriorPicsFlag equal to 0 [[equal to no_output_of_prior_pics_flag of the current AU]] is preferred under these conditions, the decoder under test is allowed to set NoOutputOfPriorPicsFlag to 1 in this case.

Otherwise, if no_output_of_prior_pics_flag is equal to 0 for each picture in the current AU, NoOutputOfPriorPicsFlag is set equal to 0 [[equal to no_output_of_prior_pics_flag of the current AU]].

Otherwise, NoOutputOfPriorPicsFlag is set equal to 1.

2. The value of NoOutputOfPriorPicsFlag derived for the decoder under test is applied for the BIRD as follows:

If NoOutputOfPriorPicsFlag is equal to 1, all picture storage buffers in the DPB are emptied without output of the pictures they contain and the DPB fullness is set equal to 0.

Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.

Otherwise (the current picture is not a CLVSS picture or the CLVSS picture is picture 0), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:

The number of pictures in the DPB that are marked as "needed for output" is greater than max_num_reorder_pics[Htid].

max_latency_increase_plus1[Htid] is not equal to 0 and there is at least one picture in the DPB that is marked as "needed for output" for which the associated variable PicLatencyCount is greater than or equal to MaxLatencyPictures[Htid].

The number of pictures in the DPB is greater than or equal to max_dec_pic_buffering_minus1[Htid]+1.

6.3. Third Embodiment

This embodiment is for item 6, item 7 (the changed texts excepts the NOTE added in clause 8.1.2) and item 7a (the NOTE added in clause 8.1.2).

7.4.3.7 Picture Header Structure Semantics
. . .
recovery_poc_cnt specifies the recovery point of decoded pictures in output order.

When the current picture is a GDR picture, the variable recoveryPointPocVal is derived as follows:

$$\text{recoveryPointPocVal} = \text{PicOrderCntVal} + \text{recovery\_poc\_cnt} \quad (81)$$

If the current picture is a GDR picture-[[that is associated with the PH]], and there is a picture picA that follows the current GDR picture in decoding order in the CLVS that has PicOrderCntVal equal to recoveryPointPocVal [[the PicOrderCntVal of the current GDR picture plus the value of recovery_poc_cnt]], the picture picA is referred to as the recovery point picture. Otherwise, the first picture in output order that has PicOrderCntVal greater than recoveryPointPocVal [[the PicOrderCntVal of the current picture plus the value of recovery_poc_cnt]] in the CLVS is referred to as the recovery point picture. The recovery point picture shall not precede the current GDR picture in decoding order. The pictures that are associated with the current GDR picture and have PicOrderCntVal less than recoveryPointPocVal are referred to as the recovering pictures of the GDR picture. The value of recovery_poc_cnt shall be in the range of 0 to MaxPicOrderCntLsb−1, inclusive.

[[When the current picture is a GDR picture, the variable RpPicOrderCntVal is derived as follows:

$$\text{RpPicOrderCntVal} = \text{PicOrderCntVal} + \text{recovery\_poc\_cnt} \quad (81)]]$$

NOTE 2—When gdr_enabled_flag is equal to 1 and PicOrderCntVal of the current picture is greater than or equal to recoveryPointPocVal [[RpPicOrderCntVal]] of the associated GDR picture, the current and subsequent decoded pictures in output order are exact match to the corresponding pictures produced by starting the decoding process from the previous TRAP picture, when present, preceding the associated GDR picture in decoding order.

. . .
8.1.2 Decoding Process for a Coded Picture
. . .
The variable PictureOutputFlag of the current picture is set as follows:

If sps_video_parameter_set_id is greater than 0 and the current layer is not an output layer (i.e., nuh_layer_id is not equal to OutputLayerIdInOls[TargetOlsIdx][i] for any value of i in the range of 0 to NumOutputLayersInOls[TargetOlsIdx]−1, inclusive), or one of the following conditions is true, PictureOutputFlag is set equal to 0:

The current picture is a RASL picture and NoOutputBeforeRecoveryFlag of the associated IRAP picture is equal to 1.

The current picture is a GDR picture with NoOutputBeforeRecoveryFlag equal to 1 or a recovering picture of a GDR picture with NoOutputBeforeRecoveryFlag equal to 1.

Otherwise, PictureOutputFlag is set equal to pic_output_flag.

NOTE—In an implementation, the decoder may output a picture not belong to an output layer. For example, when there is only one output layer while in an AU the picture of the output layer is not available, due to a loss or layer down-switching, the decoder may set PictureOutputFlag set equal to 1 for the picture that has the highest value of nuh_layer_id among all pictures of the AU available to the decoder and having pic_ output_flag equal to 1, and set PictureOutputFlag equal to 0 for all other pictures of the AU available to the decoder.

[[PictureOutputFlag is set as follows:
　If one of the following conditions is true, PictureOutputFlag is set equal to 0:
　　the current picture is a RASL picture and NoOutputBeforeRecoveryFlag of the associated IRAP picture is equal to 1.
　　gdr_enabled_flag is equal to 1 and the current picture is a GDR picture with NoOutputBeforeRecoveryFlag equal to 1.
　　gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture.
　　sps_video_parameter_set_id is greater than 0, ols_mode_idc is equal to 0 and the current AU contains a picture picA that satisfies all of the following conditions:
　　　PicA has PictureOutputFlag equal to 1.
　　　PicA has nuh_layer_id nuhLid greater than that of the current picture.
　　　PicA belongs to the output layer of the OLS (i.e., OutputLayerIdInOls[TargetOlsIdx][0] is equal to nuhLid).
　　sps_video_parameter_set_id is greater than 0, ols_mode_idc is equal to 2, and ols_output_layer_flag[TargetOlsIdx][GeneralLayerIdx[nuh_layer_id]] is equal to 0.
　Otherwise, PictureOutputFlag is set equal to pic_output_flag.]]

. . .

6.4. Fourth Embodiment

This embodiment is for item 6 and 7a.
8.1.2 Decoding Process for a Coded Picture
. . .
PictureOutputFlag is set as follows:
　If one of the following conditions is true, PictureOutputFlag is set equal to 0:
　　the current picture is a RASL picture and NoOutputBeforeRecoveryFlag of the associated IRAP picture is equal to 1.
　　gdr_enabled_flag is equal to 1 and the current picture is a GDR picture with NoOutputBeforeRecoveryFlag equal to 1.
　　gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture.
　　sps_video_parameter_set_id is greater than 0, ols_mode_idc is equal to 0, the current layer is not the target output layer (i.e., nuh_layer_id is less than OutputLayerIdInOls[TargetOlsIdx][0]), and a picture with pic_output_flag equal to 1 and nuh_layer_id greater than that of the current picture in the current AU is present.
　　[[sps_video_parameter_set_id is greater than 0, ols_mode_idc is equal to 0 and the current AU contains a picture picA that satisfies all of the following conditions:
　　　PicA has PictureOutputFlag equal to 1.
　　　PicA has nuh_layer_id nuhLid greater than that of the current picture.
　　　PicA belongs to the output layer of the OLS (i.e., OutputLayerIdInOls[TargetOlsIdx][0] is equal to nuhLid).]]
　　sps_video_parameter_set_id is greater than 0, ols_mode_idc is equal to 2, and ols_output_layer_flag[TargetOlsIdx][GeneralLayerIdx[nuh_layer_id]] is equal to 0.
　Otherwise, PictureOutputFlag is set equal to pic_output_flag.

. . .

6.5. Fifth Embodiment

This embodiment is for item 6 only.
8.1.2 Decoding Process for a Coded Picture
. . .
PictureOutputFlag is set as follows:
　If one of the following conditions is true, PictureOutputFlag is set equal to 0:
　　the current picture is a RASL picture and NoOutputBeforeRecoveryFlag of the associated IRAP picture is equal to 1.
　　gdr_enabled_flag is equal to 1 and the current picture is a GDR picture with NoOutputBeforeRecoveryFlag equal to 1.
　　gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture.
　　sps_video_parameter_set_id is greater than 0, ols_mode_idc is equal to 0 and the current AU contains a picture picA that satisfies all of the following conditions:
　　　PicA has pic_output_flag [[PictureOutputFlag]] equal to 1.
　　　PicA has nuh_layer_id nuhLid greater than that of the current picture.
　　　PicA belongs to the output layer of the OLS (i.e., OutputLayerIdInOls[TargetOlsIdx][0] is equal to nuhLid).
　　sps_video_parameter_set_id is greater than 0, ols_mode_idc is equal to 2, and ols_output_layer_flag[TargetOlsIdx][GeneralLayerIdx[nuh_layer_id]] is equal to 0.
　Otherwise, PictureOutputFlag is set equal to pic_output_flag.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
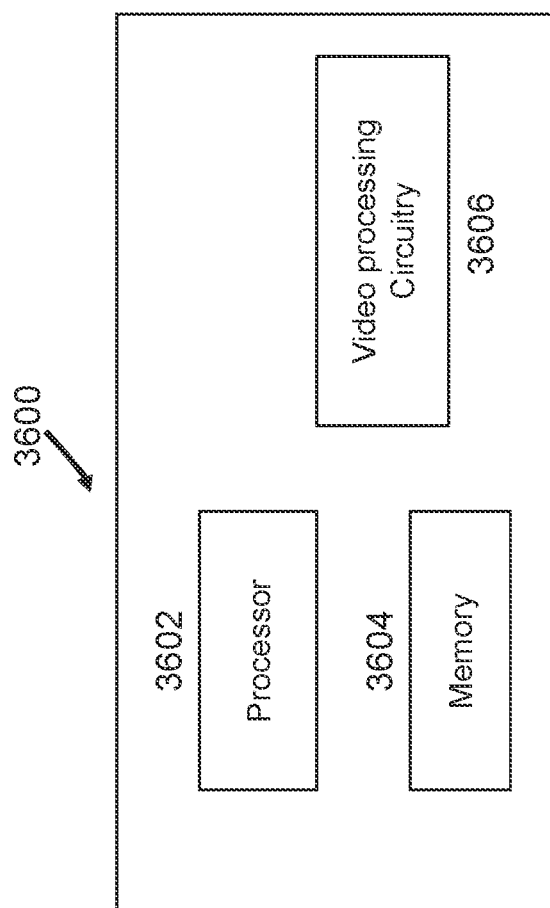
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
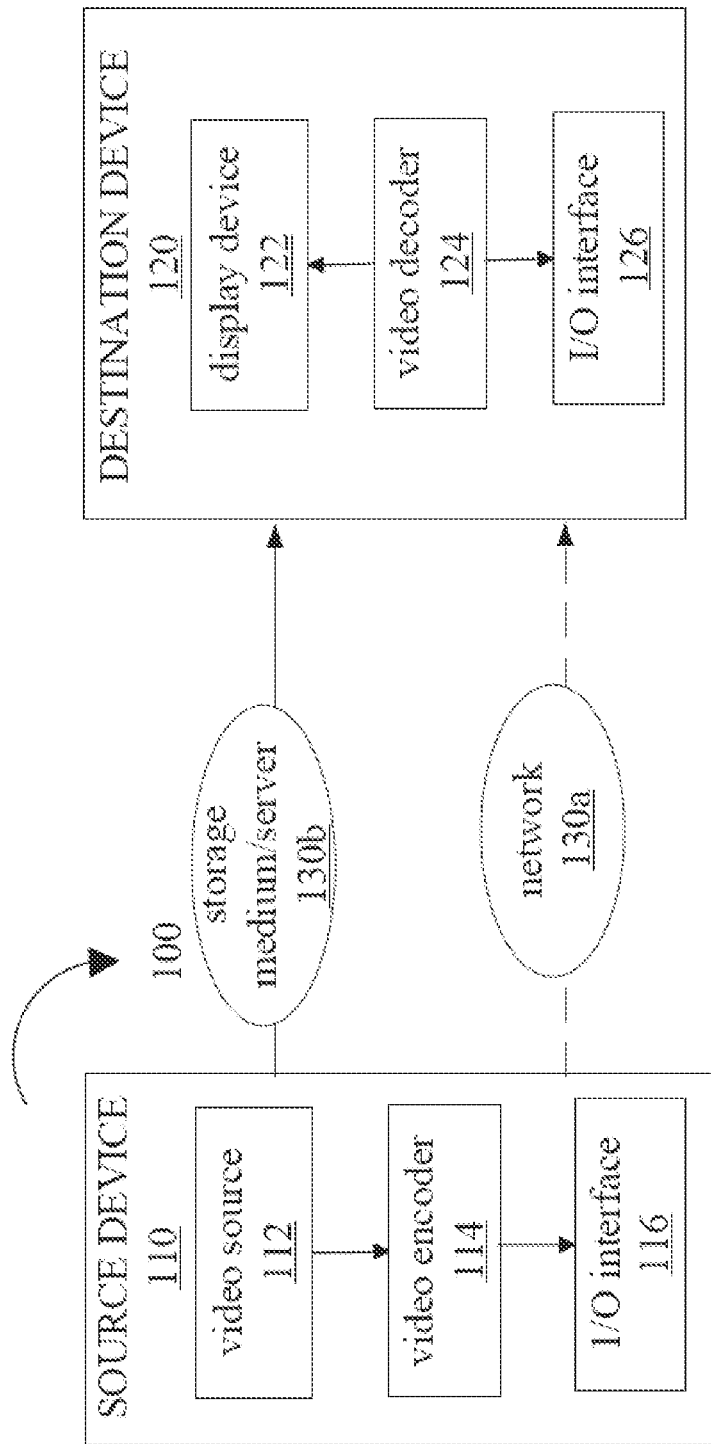
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
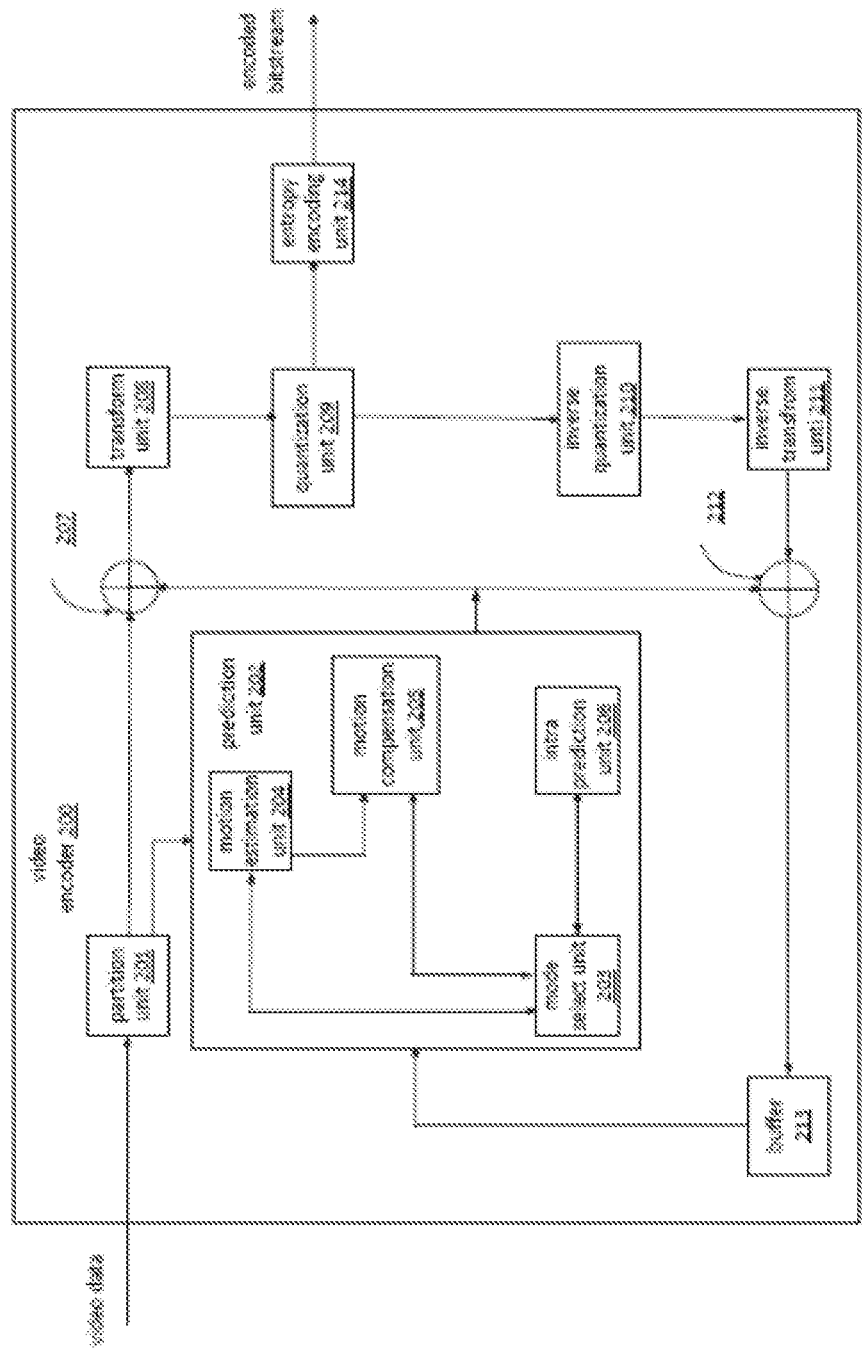
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
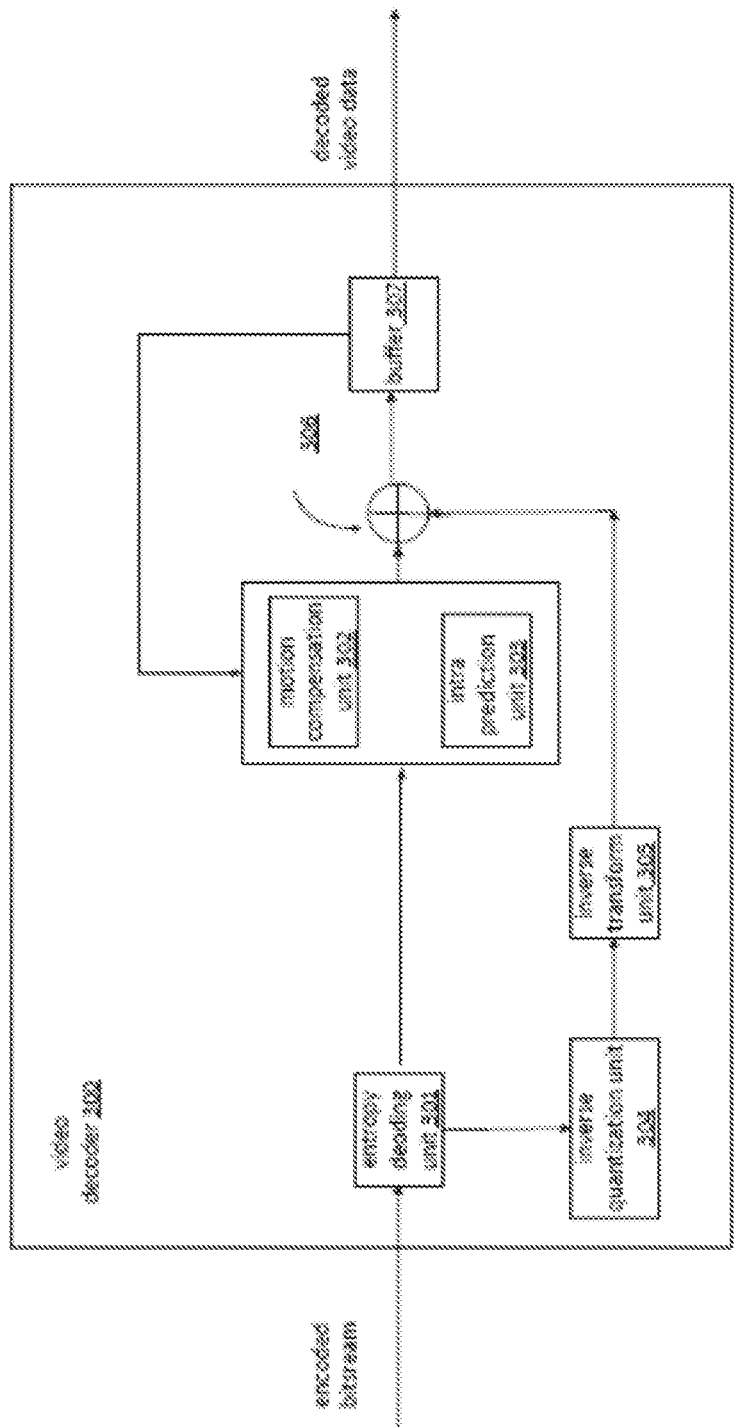
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section. The following clauses show example embodiments of techniques discussed in the previous section (e.g., item 1).

Figure 3:
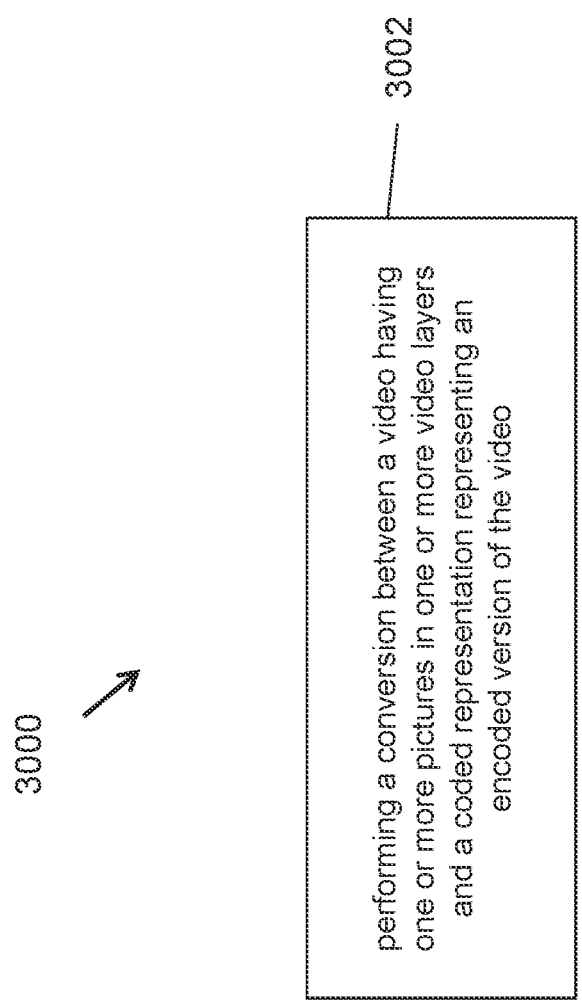
FIG. 3 is a flowchart for an example method of video processing.

1. A video processing method (e.g., method 3000 shown in FIG. 3), comprising: performing (3002) a conversion between a video having one or more video layers comprising one or more video pictures and a coded representation of the video; wherein the coded representation includes a video parameter set that indicates a maximum value of a chroma format indicator and/or a maximum value of bit depth used to represent pixels of the video.

The following clauses show example embodiments of techniques discussed in the previous section (e.g., item 2).

2. A video processing method, comprising: performing a conversion between a video having one or more video layers and a coded representation of the video, wherein the coded representation conforms to a format rule that specifies that a maximum picture width and/or a maximum picture height for video pictures of all video layers controls a value of a variable that indicates whether pictures in a decoder buffer are output prior to removing from the decoder buffer.

3. The method of clause 2, wherein the variable is signaled in a video parameter set.

The following clauses show example embodiments of techniques discussed in the previous section (e.g., item 3).

4. A video processing method, comprising: performing a conversion between a video having one or more video layers and a coded representation of the video, wherein the coded representation conforms to a format rule that specifies that maximum value of a chroma format indicator and/or a maximum value of bit depth used to represent pixels of the video control a value of a variable that indicates whether pictures in a decoder buffer are output prior to removing from the decoder buffer.

5. The method of clause 4, wherein the variable is signaled in a video parameter set.

The following clauses show example embodiments of techniques discussed in the previous section (e.g., item 4).

6. A video processing method, comprising: performing a conversion between a video having one or more video layers and a coded representation of the video, wherein the coded representation conforms to a format rule that specifies that a value of a variable that indicates whether pictures in a decoder buffer are output prior to removing from the decoder buffer is independent of whether separate color planes are used for encoding the video.

The following clauses show example embodiments of techniques discussed in the previous section (e.g., item 5).

7. A video processing method, comprising: performing a conversion between a video having one or more video layers and a coded representation of the video, wherein the coded representation conforms to a format rule that specifies that a value of a variable that indicates whether pictures in a decoder buffer are output prior to removing from the decoder buffer is included in the coded representation at an access unit (AU) level.

8. The method of clause 7, wherein the format rule specifies that the value is same for all AUs in the coded representation.

9. The method of any of clauses 7-8, wherein the variable is indicated in a picture header.

10. The method of any of clauses 7-8, wherein the variable is indicated in a access unit delimiter.

The following clauses show example embodiments of techniques discussed in the previous section (e.g., item 6).

11. A video processing method, comprising: performing a conversion between a video having one or more video layers and a coded representation of the video, wherein the coded representation conforms to a format rule that specifies that a picture output flag for a video picture in an access unit is determined based on a pic_output_flag variable of another video picture in the access unit.

The following clauses show example embodiments of techniques discussed in the previous section (e.g., item 7).

12. A video processing method, comprising: performing a conversion between a video having one or more video layers and a coded representation of the video, wherein the coded representation conforms to a format rule that specifies that, for a video picture that does not belong to an output layer, a value of a picture output flag.

13. The method of clause 12, wherein the format rule specifies that the value of the picture output flag for a video picture is set to zero.

14. The method of clause 12, wherein the video comprises only one output layer, and wherein an access unit that does not include the output layer is coded by setting the picture output flag value to logical 1 for a picture having a highest layer id value and to logical zero for all other pictures.

The following clauses show example embodiments of techniques discussed in the previous section (e.g., item 8).

15. The method of any of clauses 1-14, wherein the picture output flag is included in an access unit delimited.

16. The method of any clauses 1-14, wherein the picture output flag is included in a supplemental enhancement information field.

17. The method of any of clauses 1-14, wherein the picture output flag is included in picture headers of one or more pictures.

18. The method of any of clauses 1 to 17, wherein the conversion comprises encoding the video into the coded representation.

19. The method of any of clauses 1 to 17, wherein the conversion comprises decoding the coded representation to generate pixel values of the video.

20. A video decoding apparatus comprising a processor configured to implement a method recited in one or more of clauses 1 to 19.

21. A video encoding apparatus comprising a processor configured to implement a method recited in one or more of clauses 1 to 19.

22. A computer program product having computer code stored thereon, the code, when executed by a processor, causes the processor to implement a method recited in any of clauses 1 to 19.

23. A method, apparatus or system described in the present document.

The second set of clauses show example embodiments of techniques discussed in the previous section (e.g., items 1-4).

Figure 7A:
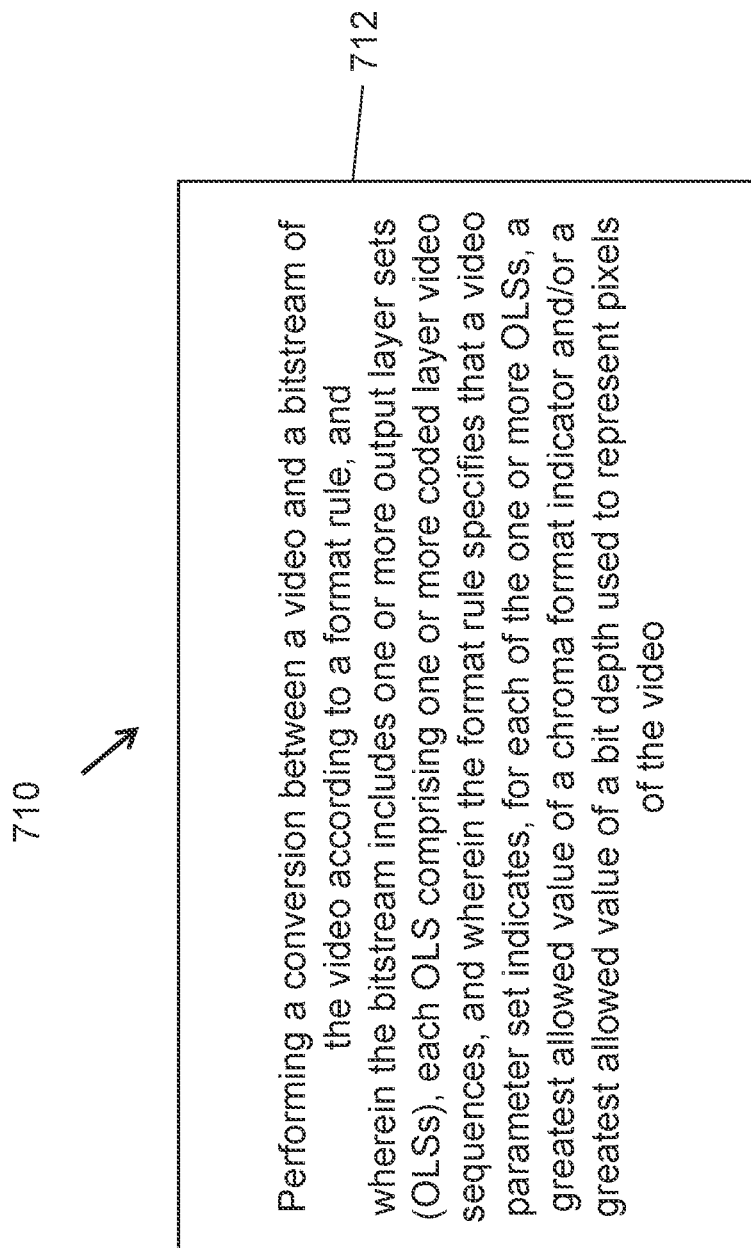

1. A method of video processing (e.g., method 710 as shown in FIG. 7A), comprising: performing 712 a conversion between a video and a bitstream of the video according to a format rule, wherein the bitstream includes one or more output layer sets (OLSs), each OLS comprising one or more coded layer video sequences, and wherein the format rule specifies that a video parameter set indicates, for each of the one or more OLSs, a greatest allowed value of a chroma format indicator and/or a greatest allowed value of a bit depth used to represent pixels of the video.

2. The method of clause 1, wherein the greatest allowed value of the chroma format indicator for an OLS is applicable to all sequence parameter sets that are referred to by the one or more coded layer video sequences in the OLS.

3. The method of clause 1 or 2, wherein the greatest allowed value of the bit depth for an OLS is applicable to all sequence parameter sets that are referred to by the one or more coded layer video sequences in the OLS.

4. The method of any of clauses 1 to 3, wherein, for performing the conversion for an OLS containing more than one coded layer video sequence and having an OLS index, i, the rule specifies to allocate memory for a decoded picture buffer according to values of at least one of syntax elements that include ols_dpb_pic_width[i] indicating a width of each picture storage buffer for an i-th OLS, ols_dpb_pic_height[i] indicating a height of each picture storage buffer for the i-th OLS, a syntax element indicating the greatest allowed value of the chroma format indicator for the i-th OLS, and a syntax element indicating the greatest allowed value of a bit depth for the i-th OLS.

5. The method of any of clauses 1 to 4, wherein the video parameter set is included in the bitstream.

6. The method of any of clauses 1 to 4, wherein the video parameter set is indicated separately from the bitstream.

Figure 7B:
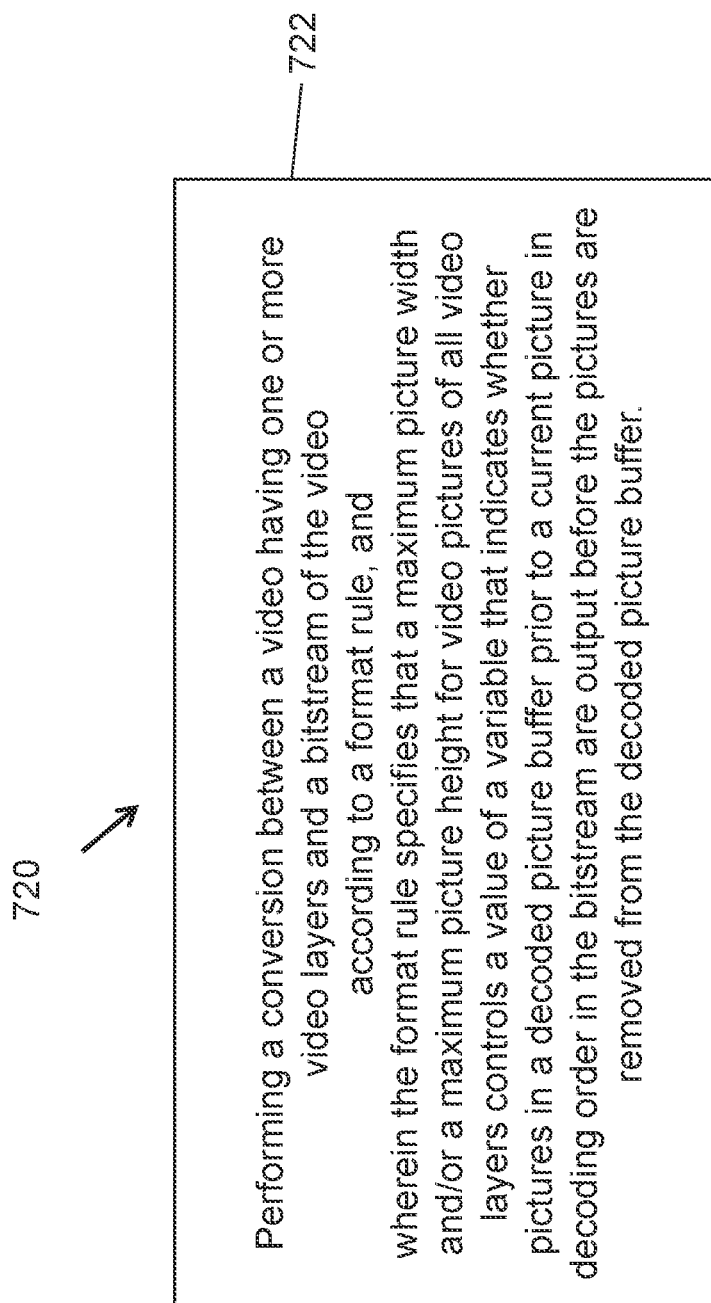

7. A method of video processing (e.g., method 720 as shown in FIG. 7B), comprising: performing 722 a conversion between a video having one or more video layers and a bitstream of the video according to a format rule, and wherein the format rule specifies that a maximum picture width and/or a maximum picture height for video pictures of all video layers controls a value of a variable that indicates whether pictures in a decoded picture buffer prior to a current picture in decoding order in the bitstream are output before the pictures are removed from the decoded picture buffer.

8. The method of clause 7, wherein the variable is derived based at least on one or more syntax elements included in a video parameter set.

9. The method of clause 7, wherein the value of the variable is set to 1 in case that a value of a maximum width of each picture, a maximum height of each picture, a greatest allowed value of a chroma format indicator, or a greatest allowed value of a bit depth that is derived for a current access unit is different from a value of a maximum width of each picture, a maximum height of each picture, a greatest allowed value of a chroma format indicator or a greatest allowed value of a bit depth that is derived for a preceding access unit in decoding order.

10. The method of clause 9, wherein the value of the variable being equal to 1 indicates pictures in a decoded picture buffer prior to a current picture in decoding order are not output before the pictures are removed from the decoded picture buffer.

11. The method of any of clauses 7 to 10, wherein the value of the variable is further based on a greatest allowed value of a chroma format indicator and/or a greatest allowed value of a bit depth used to represent pixels of the video.

12. The method of any of clauses 7 to 11, wherein the video parameter set is included in the bitstream.

13. The method of any of clauses 7 to 11, wherein the video parameter set is indicated separately from the bitstream.

14. A method of video processing (e.g., 730 as shown in FIG. 7C), comprising: performing 732 a conversion between a video having one or more video layers and a bitstream of the video according to a format rule, and wherein the format rule specifies that a greatest allowed value of a chroma format indicator and/or a greatest allowed value of a bit depth used to represent pixels of the video control a value of a variable that indicates whether pictures in a decoded picture buffer prior to a current picture in decoding order in the bitstream are output before the pictures are removed from the decoded picture buffer.

15. The method of clause 14, wherein the variable is derived based at least on one or more syntax elements signaled in a video parameter set.

16. The method of clause 14, wherein the value of the variable is set to 1 in case that a value of a maximum width of each picture, a maximum height of each picture, a greatest allowed value of a chroma format indicator or a greatest allowed value of a bit depth that is derived for a current access unit is different from a value of a maximum width of each picture, a maximum height of each picture, a greatest allowed value of a chroma format indicator or a greatest allowed value of a bit depth that is derived for a preceding access unit in decoding order.

17. The method of clause 16, wherein the value of the variable being equal to 1 indicates pictures in a decoded picture buffer prior to a current picture in decoding order are not output before the pictures are removed from the decoded picture buffer.

18. The method of any of clauses 14 to 17, wherein the value of the variable is further based on a maximum picture width and/or a maximum picture height for video pictures of all video layers.

19. The method of any of clauses 14 to 18, wherein the video parameter set is included in the bitstream.

20. The method of any of clauses 14 to 18, wherein the video parameter set is indicated separately from the bitstream.

21. A method of video processing (e.g., method 740 as shown in FIG. 7D), comprising: performing 742 a conversion between a video having one or more video layers and a bitstream of the video according to a rule, and wherein the rule specifies that a value of a variable that indicates whether pictures in a decoded picture buffer prior to a current picture in decoding order in the bitstream are output before the pictures are removed from the decoded picture buffer is independent of whether separate color planes are used for encoding the video.

22. The method of clause 21, wherein, in case that separate color planes are not used for encoding the video, the rule specifies that decoding is performed only once for a video picture or, in case that separate color planes are used for encoding the video, the rule specifies that picture decoding is invoked three times.

23. The method of any of clauses 1 to 22, wherein the conversion includes encoding the video into the bitstream.

24. The method of any of clauses 1 to 22, wherein the conversion includes decoding the video from the bitstream.

25. The method of any of clauses 1 to 22, wherein the conversion includes generating the bitstream from the video, and the method further comprises: storing the bitstream in a non-transitory computer-readable recording medium.

26. A video processing apparatus comprising a processor configured to implement a method recited in any one or more of clauses 1 to 25.

27. A method of storing a bitstream of a video, comprising, a method recited in any one of clauses 1 to 25, and further including storing the bitstream to a non-transitory computer-readable recording medium.

28. A computer readable medium storing program code that, when executed, causes a processor to implement a method recited in any one or more of clauses 1 to 25.

29. A computer readable medium that stores a bitstream generated according to any of the above described methods.

30. A video processing apparatus for storing a bitstream representation, wherein the video processing apparatus is configured to implement a method recited in any one or more of clauses 1 to 25.

The third set of clauses show example embodiments of techniques discussed in the previous section (e.g., item 5).

Figure 8A:
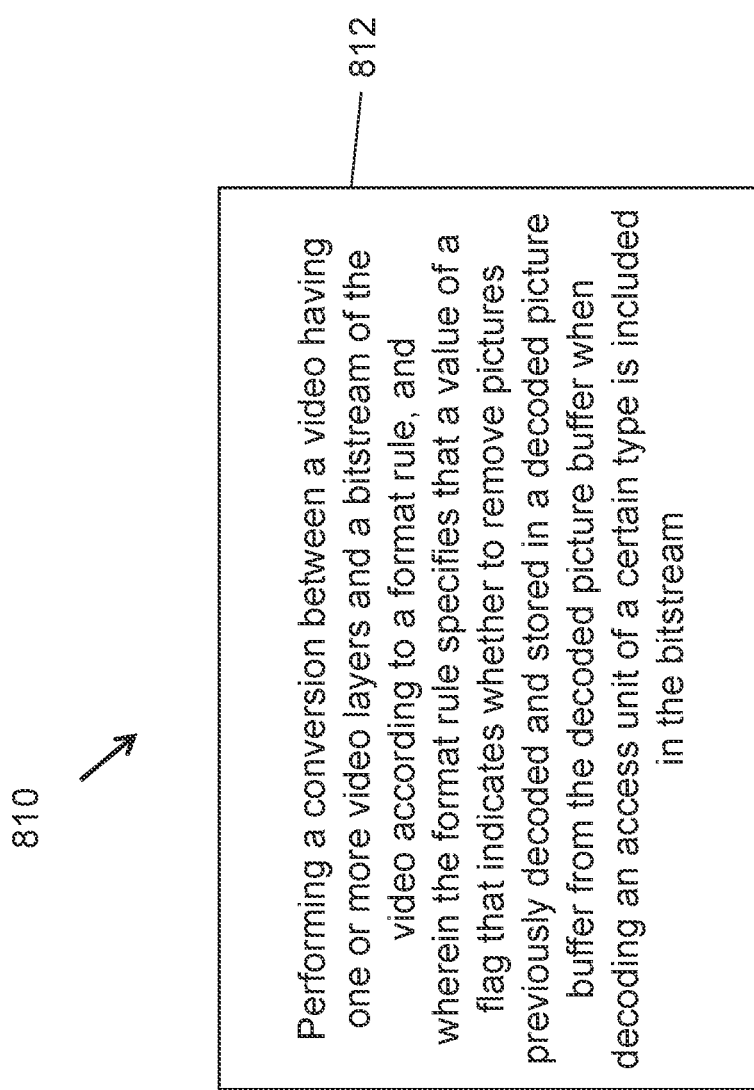
FIGS. 8A to 8C show flowcharts for example methods of video processing based on some implementations of the disclosed technology.

1. A method of video processing (e.g., method 810 as shown in FIG. 8A), comprising: performing 812 a conversion between a video having one or more video layers and a bitstream of the video according to a format rule, and wherein the format rule specifies that a value of a flag that indicates whether to remove pictures previously decoded and stored in a decoded picture buffer from the decoded picture buffer when decoding an access unit of a certain type is included in the bitstream.

2. The method of clause 1, wherein the format rule specifies that the value is same for all pictures in an access unit.

3. The method of clause 1 or 2, wherein the format rule specifies that a value of a variable that indicates whether pictures in the decoded picture buffer prior to a current picture in decoding order in the bitstream are output before the pictures are removed from the decoded picture buffer is based on the value of the flag.

4. The method of any of clauses 1 to 3, wherein the flag is indicated in a picture header.

5. The method of any of clauses 1 to 3, wherein the flag is indicated in a slice header.

Figure 8B:
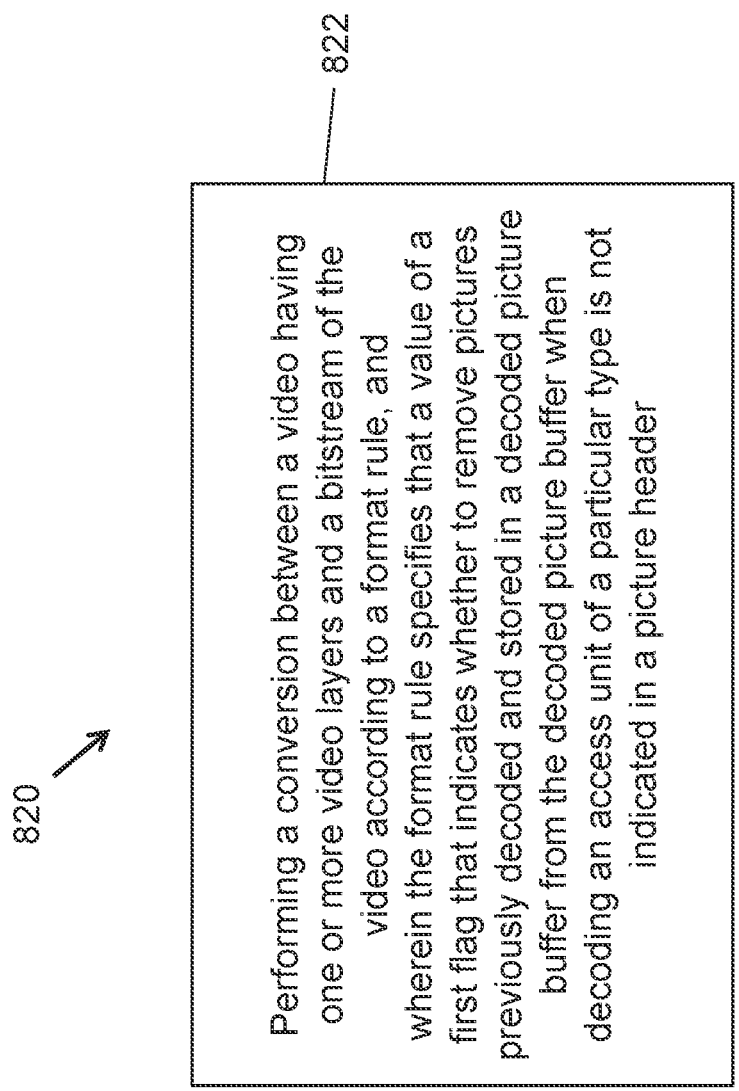

6. A method of video processing (e.g., method 820 as shown in FIG. 8B), comprising: performing 822 a conversion between a video having one or more video layers and a bitstream of the video according to a format rule, and wherein the format rule specifies that a value of a first flag that indicates whether to remove pictures previously decoded and stored in a decoded picture buffer from the decoded picture buffer when decoding an access unit of a particular type is not indicated in a picture header.

7. The method of clause 6, wherein the first flag is indicated in an access unit delimiter.

8. The method of clause 6, wherein a second flag indicating an TRAP (intra random access point picture) or GDR (gradual decoding refresh) access unit has a certain value.

9. The method of clause 6, wherein the value of the first flag is inferred to be equal to 1 in case that an access unit delimiter is not present for an TRAP (intra random access point picture) or GDR (gradual decoding refresh) access unit.

Figure 8C:
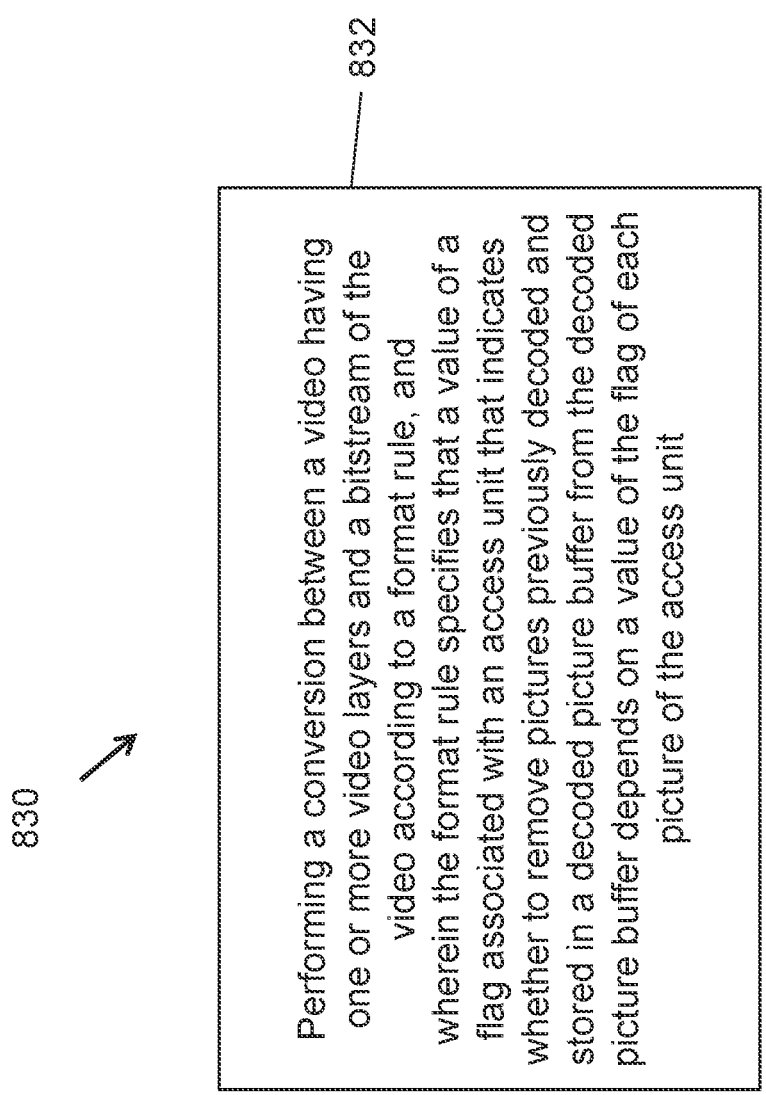

10. A method of video processing (e.g., method 830 as shown in FIG. 8C), comprising: performing 832 a conversion between a video having one or more video layers and a bitstream of the video according to a format rule, and wherein the format rule specifies that a value of a flag associated with an access unit that indicates whether to remove pictures previously decoded and stored in a decoded picture buffer from the decoded picture buffer depends on a value of the flag of each picture of the access unit.

11. The method of clause 10, wherein the format rule specifies that the value of the flag of the access unit is considered to be equal to 0 in case that the flag for each picture of an access unit is equal to 0, and otherwise the value of the flag of the access unit is considered as equal to 1.

12. The method of any of clauses 1 to 11, wherein the conversion includes encoding the video into the bitstream.

13. The method of any of clauses 1 to 11, wherein the conversion includes decoding the video from the bitstream.

14. The method of any of clauses 1 to 11, wherein the conversion includes generating the bitstream from the video, and the method further comprises: storing the bitstream in a non-transitory computer-readable recording medium.

15. A video processing apparatus comprising a processor configured to implement a method recited in any one or more of clauses 1 to 14.

16. A method of storing a bitstream of a video, comprising, a method recited in any one of clauses 1 to 14, and further including storing the bitstream to a non-transitory computer-readable recording medium.

17. A computer readable medium storing program code that, when executed, causes a processor to implement a method recited in any one or more of clauses 1 to 14.

18. A computer readable medium that stores a bitstream generated according to any of the above described methods.

19. A video processing apparatus for storing a bitstream representation, wherein the video processing apparatus is configured to implement a method recited in any one or more of clauses 1 to 14.

The fourth set of clauses show example embodiments of techniques discussed in the previous section (e.g., items 6-8).

Figure 9A:

1. A method of video processing (e.g., method 910 as shown in FIG. 9A), comprising: 912 performing a conversion between a video having one or more video layers and a bitstream of the video according to a format rule, and wherein the format rule specifies that a value of a variable indicating whether to output a picture in an access unit is determined based on a flag indicating whether to output another picture in the access unit.

2. The method of clause 1, wherein the another picture is in a higher layer than the picture.

3. The method of clause 1 or 2, wherein the flag controls the decoded picture output and removal processes.

4. The method of clause 1 or 2, wherein the flag is a syntax element included in a sequence parameter set (SPS), a video parameter set (VPS), a picture parameter set (PPS), a picture header, a slice header, or a tile group header.

5. The method of any of clauses 1 to 4, wherein the value of the variable is further based on at least one of i) a flag specifying a value of an identifier for the video parameter set (VPS), ii) whether a current video layer is an output layer, ii) whether a current picture is a random access skipped leading picture, a gradual decoding refresh picture, a recovering picture of a gradual decoding refresh picture, or iii) whether pictures in the decoded picture buffer prior to the current picture in decoding order are output before the pictures are recovered.

6. The method of clause 5, wherein the value of the variable is set equal to 0 in case that i) the flag specifying the value of the identifier for the VPS is greater than 0 and the current layer is not an output layer, or ii) one of the following conditions is true:

the current picture is a random access skipped leading picture and associated intra random access point picture in the decoded picture buffer prior to the current picture in decoding order is not output before the intra random access point picture is recovered; or the current picture is a gradual decoding refresh picture with pictures in the decoded picture buffer prior to the current picture in decoding order are not output before the pictures are recovered or a recovering picture of the gradual decoding refresh picture with pictures in the decoded picture buffer prior to the current picture in decoding order are not output before the pictures are recovered.

7. The method of clause 6, wherein the value of the variable is set equal to a value of the flag in case both i) and ii) are not satisfied.

8. The method of clause 6, wherein the value of the variable being equal to 0 indicates not to output a picture in an access unit.

9. The method of clause 1, wherein the variable is PictureOutputFlag and the flag is pic_output_flag.

10. The method of any of clauses 1 to 9, wherein the flag is included in an access unit delimiter.

11. The method of any of clauses 1 to 9, wherein the flag is included in a supplemental enhancement information field.

12. The method of any of clauses 1 to 9, wherein the flag is included in picture headers of one or more pictures.

Figure 9B:
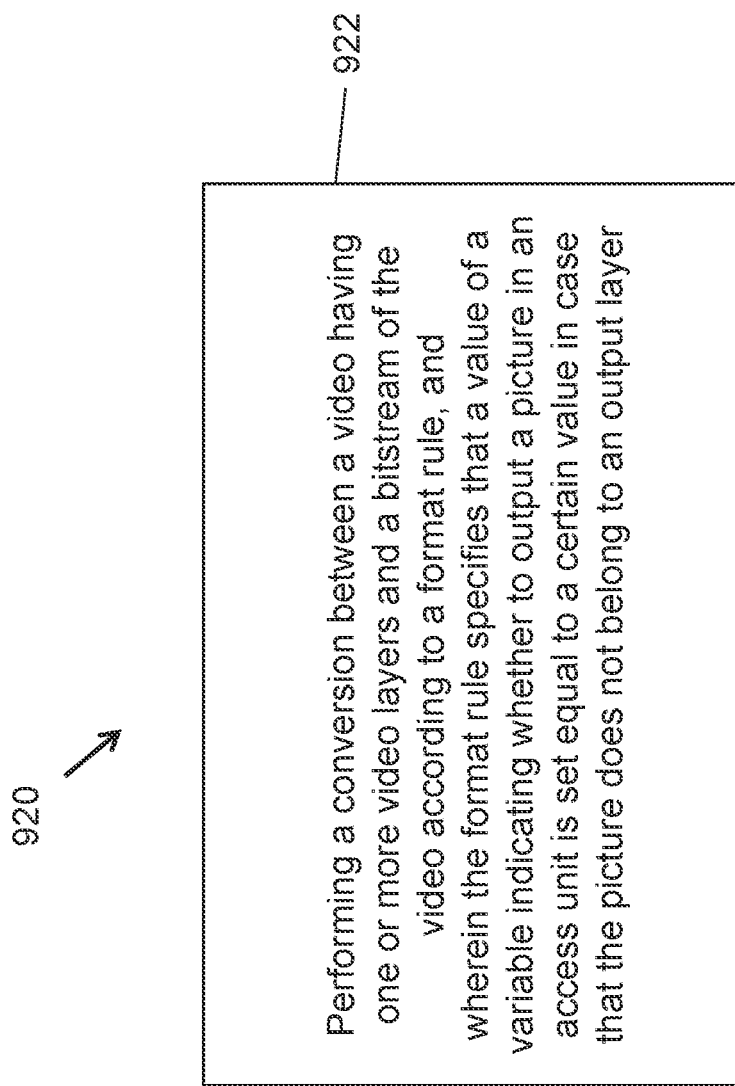

13. A method of video processing (e.g., method 920 as shown in FIG. 9B), comprising: performing 922 a conversion between a video having one or more video layers and a bitstream of the video according to a format rule, and wherein the format rule specifies that a value of a variable indicating whether to output a picture in an access unit is set equal to a certain value in case that the picture does not belong to an output layer.

14. The method of clause 13, wherein the certain value is zero.

15. A method of video processing (e.g., method 930 as shown in FIG. 9C), comprising: performing 932 a conversion between a video having one or more video layers and a bitstream of the video according to a format rule, and wherein the format rule specifies that in case that the video comprises only one output layer, an access unit that does not include an output layer is coded by setting a variable indicating whether to output a picture in the access unit to a first value for the picture having a highest layer ID (identification) value and to a second value for all other pictures.

16. The method of clause 15, wherein the first value is 1 and the second value is 0.

17. The method of any of clauses 1 to 16, wherein the conversion includes encoding the video into the bitstream.

18. The method of any of clauses 1 to 16, wherein the conversion includes decoding the video from the bitstream.
19. The method of any of clauses 1 to 16, wherein the conversion includes generating the bitstream from the video, and the method further comprises: storing the bitstream in a non-transitory computer-readable recording medium.
20. A video processing apparatus comprising a processor configured to implement a method recited in any one or more of clauses 1 to 19.
21. A method of storing a bitstream of a video, comprising, a method recited in any one of clauses 1 to 19, and further including storing the bitstream to a non-transitory computer-readable recording medium.
22. A computer readable medium storing program code that, when executed, causes a processor to implement a method recited in any one or more of clauses 1 to 19.
23. A computer readable medium that stores a bitstream generated according to any of the above described methods.
24. A video processing apparatus for storing a bitstream representation, wherein the video processing apparatus is configured to implement a method recited in any one or more of clauses 1 to 19.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   performing a conversion between a video having one or more video layers and a bitstream of the video according to a format rule,
   wherein the format rule specifies that a value of a flag that indicates whether to remove pictures previously decoded and stored in a decoded picture buffer from the decoded picture buffer when decoding an access unit of a certain type is included in the bitstream,
   wherein the format rule specifies that a value of a variable that indicates whether pictures in the decoded picture buffer prior to a current picture in decoding order in the bitstream are output before the pictures are removed from the decoded picture buffer is set to a predetermined value when a first condition related with a greatest allowed value of a chroma format indicator or a greatest allowed value of a bit depth used to represent pixels of the video is satisfied,
   wherein the value of the variable is set to the value of the flag when the first condition is not satisfied, and
   wherein the first condition is not satisfied when a color format or a bit depth of pictures changes but the greatest allowed value of the chroma format indicator or the greatest allowed value of the bit depth does not change.

2. The method of claim 1, wherein the format rule specifies that the value of the flag for the access unit is same for all pictures in the access unit.

3. The method of claim 1, wherein the format rule specifies that the value of the flag for the access unit is same for all slices in the access unit.

4. The method of claim 1, wherein the format rule specifies that the value of the flag is considered to be a value of a flag for pictures or slices of the access unit.

5. The method of claim 1, wherein the flag is indicated in a picture header.

6. The method of claim 1, wherein the flag is indicated in a slice header.

7. The method of claim 1, wherein the conversion includes encoding the video into the bitstream.

8. The method of claim 1, wherein the conversion includes decoding the video from the bitstream.

9. The method of claim 1, wherein the greatest allowed value of the chroma format indicator and/or the greatest allowed value of a bit depth used to represent pixels of the video are included in a video parameter set.

10. The method of claim 1, wherein the greatest allowed value of the chroma format indicator for a layer is applicable to all sequence parameter sets that are referred to by one or more layer video sequences in the layer.

11. An apparatus for processing video data comprising a processor and a non-transitory memory with instructions thereon, wherein the instructions upon execution by the processor, cause the processor to:
    perform a conversion between a video having one or more video layers and a bitstream of the video according to a format rule,
    wherein the format rule specifies that a value of a flag that indicates whether to remove pictures previously decoded and stored in a decoded picture buffer from the decoded picture buffer when decoding an access unit of a certain type is included in the bitstream,
    wherein the format rule specifies that a value of a variable that indicates whether pictures in the decoded picture buffer prior to a current picture in decoding order in the bitstream are output before the pictures are removed from the decoded picture buffer is set to a predetermined value when a first condition related with a greatest allowed value of a chroma format indicator or a greatest allowed value of a bit depth used to represent pixels of the video is satisfied,
    wherein the value of the variable is set to the value of the flag when the first condition is not satisfied, and
    wherein the first condition is not satisfied when a color format or a bit depth of pictures changes but the greatest allowed value of the chroma format indicator or the greatest allowed value of the bit depth does not change.

12. The apparatus of claim 11, wherein the format rule specifies that the value of the flag for the access unit is same for all pictures in the access unit.

13. The apparatus of claim 11, wherein the format rule specifies that the value of the flag for the access unit is same for all slices in the access unit.

14. The apparatus of claim 11, wherein the format rule specifies that the value of the flag is considered to be a value of a flag for pictures or slices of the access unit.

15. The apparatus of claim 11, wherein the flag is indicated in a picture header.

16. A non-transitory computer-readable storage medium storing instructions that cause a processor to:
    perform a conversion between a video having one or more video layers and a bitstream of the video according to a format rule,
    wherein the format rule specifies that a value of a flag that indicates whether to remove pictures previously decoded and stored in a decoded picture buffer from the decoded picture buffer when decoding an access unit of a certain type is included in the bitstream,
    wherein the format rule specifies that a value of a variable that indicates whether pictures in the decoded picture buffer prior to a current picture in decoding order in the bitstream are output before the pictures are removed from the decoded picture buffer is set to a predetermined value when a first condition related with a greatest allowed value of a chroma format indicator or a greatest allowed value of a bit depth used to represent pixels of the video is satisfied,
    wherein the value of the variable is set to the value of the flag when the first condition is not satisfied, and
    wherein the first condition is not satisfied when a color format or a bit depth of pictures changes but the greatest allowed value of the chroma format indicator or the greatest allowed value of the bit depth does not change.

17. The non-transitory computer-readable storage medium of claim 16, wherein the format rule specifies that the value of the flag for the access unit is same for all slices in the access unit.

18. The non-transitory computer-readable storage medium of claim 16, wherein the format rule specifies that the value of the flag is considered to be a value of a flag for pictures or slices of the access unit.

19. A non-transitory computer-readable recording medium storing a bitstream of a video which is generated by a method performed by a video processing apparatus, wherein the method comprises:

generating the bitstream of the video having one or more video layers according to a format rule, wherein the format rule specifies that a value of a flag that indicates whether to remove pictures previously decoded and stored in a decoded picture buffer from the decoded picture buffer when decoding an access unit of a certain type is included in the bitstream, wherein the format rule specifies that a value of a variable that indicates whether pictures in the decoded picture buffer prior to a current picture in decoding order in the bitstream are output before the pictures are removed from the decoded picture buffer is set to a predetermined value when a first condition related with a greatest allowed value of a chroma format indicator or a greatest allowed value of a bit depth used to represent pixels of the video is satisfied, wherein the value of the variable is set to the value of the flag when the first condition is not satisfied, and wherein the first condition is not satisfied when a color format or a bit depth of pictures changes but the greatest allowed value of the chroma format indicator or the greatest allowed value of the bit depth does not change.

* * * * *